(12) United States Patent
Birang et al.

(10) Patent No.: US 8,092,274 B2
(45) Date of Patent: *Jan. 10, 2012

(54) SUBSTRATE POLISHING METROLOGY USING INTERFERENCE SIGNALS

(75) Inventors: Manoocher Birang, Los Gatos, CA (US); Grigory Pyatigorsky, Boise, ID (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/955,690

(22) Filed: Nov. 29, 2010

(65) Prior Publication Data

US 2011/0070808 A1 Mar. 24, 2011

Related U.S. Application Data

(63) Continuation of application No. 12/793,438, filed on Jun. 3, 2010, now Pat. No. 7,841,926, which is a continuation of application No. 11/838,808, filed on Aug. 14, 2007, now Pat. No. 7,731,566, which is a continuation of application No. 11/532,498, filed on Sep. 15, 2006, now Pat. No. 7,255,629, which is a continuation of application No. 11/255,838, filed on Sep. 12, 2005, now Pat. No. 7,118,450, which is a continuation of application No. 10/405,421, filed on Apr. 1, 2003, now Pat. No. 7,011,565, which is a continuation of application No. 09/863,118, filed on May 22, 2001, now Pat. No. 6,910,944, which is a continuation of application No. 09/519,156, filed on Mar. 6, 2000, now Pat. No. 6,280,290, which is a continuation of application No. 09/258,504, filed on Feb. 26, 1999, now Pat. No. 6,045,439, which is a continuation of application No. 08/689,930, filed on Aug. 16, 1996, now Pat. No. 5,893,796, which is a continuation-in-part of application No. 08/605,769, filed on Feb. 22, 1996, now Pat. No. 5,964,643, which is a continuation-in-part of application No. 08/413,982, filed on Mar. 28, 1995, now abandoned.

(51) Int. Cl.
B24B 49/00 (2006.01)
(52) U.S. Cl. .................. 451/6; 451/5; 451/28; 451/285
(58) Field of Classification Search ................ 451/6–10, 451/28, 41, 285–288, 527, 533, 537
See application file for complete search history.

(56) References Cited

U.S. PATENT DOCUMENTS 4,037,367 A 7/1977 Kruse
(Continued)

FOREIGN PATENT DOCUMENTS

EP 0 663 265 A1 7/1995
(Continued)

OTHER PUBLICATIONS

Anonymous, Endpoint Detection of Oxide Polishing and Planarization of Semiconductor Devices, Research Disclosure No. 340, Kenneth Mason Publication, Ltd., Aug. 1992.

(Continued)

Primary Examiner — Lee D Wilson
(74) Attorney, Agent, or Firm — Fish & Richardson P.C.

(57) ABSTRACT

A polishing pad assembly for a chemical mechanical polishing apparatus includes a polishing pad having a polishing surface and a surface opposite the polishing surface for attachment to a platen, and a solid light-transmissive window formed in the polishing pad. The light-transmissive window is more transmissive to light than the polishing pad. The light-transmissive window has a light-diffusing bottom surface.

6 Claims, 19 Drawing Sheets

U.S. PATENT DOCUMENTS

| | | |
|---|---|---|
| 4,272,924 A | 6/1981 | Masuko et al. |
| 4,328,068 A | 5/1982 | Curtis |
| 4,512,847 A | 4/1985 | Brunsch et al. |
| 4,793,895 A | 12/1988 | Kaanta et al. |
| 4,927,485 A | 5/1990 | Cheng et al. |
| 4,948,259 A | 8/1990 | Enke et al. |
| 4,954,142 A | 9/1990 | Carr et al. |
| 5,020,283 A | 6/1991 | Tuttle |
| 5,081,421 A | 1/1992 | Miller et al. |
| 5,081,796 A | 1/1992 | Schultz |
| 5,084,071 A | 1/1992 | Nenadic et al. |
| 5,132,617 A | 7/1992 | Leach et al. |
| 5,177,908 A | 1/1993 | Tuttle |
| 5,196,353 A | 3/1993 | Sandhu et al. |
| 5,213,655 A | 5/1993 | Leach et al. |
| 5,234,868 A | 8/1993 | Cote |
| 5,242,524 A | 9/1993 | Leach et al. |
| RE34,425 E | 11/1993 | Schultz |
| 5,257,478 A | 11/1993 | Hyde et al. |
| 5,265,378 A | 11/1993 | Rostoker |
| 5,297,364 A | 3/1994 | Tuttle |
| 5,329,734 A | 7/1994 | Yu |
| 5,337,015 A | 8/1994 | Lustig et al. |
| 5,394,655 A | 3/1995 | Allen et al. |
| 5,395,801 A | 3/1995 | Doan et al. |
| 5,413,941 A | 5/1995 | Koos et al. |
| 5,433,651 A | 7/1995 | Lustig et al. |
| 5,486,129 A | 1/1996 | Sandhu et al. |
| 5,489,233 A | 2/1996 | Cook et al. |
| 5,514,245 A | 5/1996 | Doan et al. |
| 5,567,503 A | 10/1996 | Sexton et al. |
| 5,605,760 A | 2/1997 | Roberts |
| 5,609,511 A | 3/1997 | Moriyama et al. |
| 5,643,048 A | 7/1997 | Iyer |
| 5,663,797 A | 9/1997 | Sandhu |
| 5,672,091 A | 9/1997 | Takahashi et al. |
| 5,791,969 A | 8/1998 | Lund |
| 5,838,447 A | 11/1998 | Hiyama et al. |
| 5,893,796 A | 4/1999 | Birang et al. |
| 5,910,043 A | 6/1999 | Manzonie et al. |
| 5,949,927 A | 9/1999 | Tang |
| 5,964,643 A | 10/1999 | Birang et al. |
| 6,045,439 A | 4/2000 | Birang et al. |
| 6,068,539 A | 5/2000 | Bajaj et al. |
| 6,146,248 A | 11/2000 | Jairath et al. |
| 6,159,073 A | 12/2000 | Wiswesser et al. |
| 6,171,181 B1 | 1/2001 | Roberts et al. |
| 6,179,709 B1 | 1/2001 | Redeker et al. |
| 6,190,234 B1 | 2/2001 | Swedek et al. |
| 6,224,460 B1 | 5/2001 | Dunton et al. |
| 6,247,998 B1 | 6/2001 | Wiswesser et al. |
| 6,248,130 B1 | 6/2001 | Perry |
| 6,280,289 B1 | 8/2001 | Wiswesser et al. |
| 6,280,290 B1 | 8/2001 | Birang et al. |
| 6,336,841 B1 | 1/2002 | Chang |
| 6,383,058 B1 | 5/2002 | Birang et al. |
| 6,524,164 B1 | 2/2003 | Tolles |
| 6,537,133 B1 | 3/2003 | Birang et al. |
| 6,676,717 B1 | 1/2004 | Birang et al. |
| 6,719,818 B1 | 4/2004 | Birang et al. |
| 6,860,791 B2 | 3/2005 | Birang et al. |
| 6,875,078 B2 | 4/2005 | Birang et al. |
| 6,876,454 B1 | 4/2005 | Birang et al. |
| 6,910,944 B2 | 6/2005 | Birang et al. |
| 7,011,565 B2 | 3/2006 | Birang et al. |
| 7,118,450 B2 | 10/2006 | Birang et al. |
| 7,255,629 B2 | 8/2007 | Birang et al. |
| 7,731,566 B2 | 6/2010 | Birang et al. |
| 7,841,926 B2 * | 11/2010 | Birang et al. ............ 451/6 |
| 2003/0190867 A1 | 10/2003 | Birang et al. |
| 2005/0191945 A1 | 9/2005 | Petroski et al. |
| 2006/0014476 A1 | 1/2006 | Birang et al. |
| 2006/0040588 A1 | 2/2006 | Elledge |
| 2006/0063471 A1 | 3/2006 | Muldowney |
| 2006/0128271 A1 | 6/2006 | Shiho et al. |
| 2006/0217038 A1 | 9/2006 | Wolf |
| 2007/0021037 A1 | 1/2007 | Birang et al. |
| 2008/0227367 A1 | 9/2008 | Birang et al. |
| 2010/0240281 A1 * | 9/2010 | Birang et al. ............ 451/5 |

FOREIGN PATENT DOCUMENTS

| | | |
|---|---|---|
| EP | 0 738 561 A1 | 10/1996 |
| EP | 0 846 040 | 2/1997 |
| EP | 0 881 040 | 12/1998 |
| EP | 0 881 484 | 12/1998 |
| FR | 1075634 | 10/1954 |
| JP | 57-138575 | 8/1982 |
| JP | 58-004353 | 1/1983 |
| JP | 58-178526 | 10/1983 |
| JP | 62-190726 | 8/1987 |
| JP | 62-190728 | 8/1987 |
| JP | 62211927 | 9/1987 |
| JP | 2222533 | 9/1990 |
| JP | 3-234467 | 10/1991 |
| JP | 5138531 | 6/1993 |
| JP | 5-309558 | 11/1993 |
| JP | 60-37076 | 2/1994 |
| JP | 7-052032 | 2/1995 |
| JP | 9-36072 | 1/1997 |
| WO | WO93/20976 | 10/1993 |
| WO | WO 94/07110 | 3/1994 |

OTHER PUBLICATIONS

Rodel, "Glass Polishing Pad", Jan. 1993.

* cited by examiner

SUBSTRATE POLISHING METROLOGY USING INTERFERENCE SIGNALS

CROSS-REFERENCE TO RELATED APPLICATIONS

This application is a continuation and claims the benefit of priority under 35 U.S.C. Section 120 of U.S. patent application Ser. No. 12/793,438, filed Jun. 3, 2010, which is a continuation of U.S. patent application Ser. No. 11/838,808, filed Aug. 14, 2007, now U.S. Pat. No. 7,731,566, which is a continuation of U.S. patent application Ser. No. 11/532,498, filed Sep. 15, 2006, now U.S. Pat. No. 7,255,629, which is a continuation of U.S. patent application Ser. No. 11/225,838, filed Sep. 12, 2005, now U.S. Pat. No. 7,118,450, which is a continuation of U.S. patent application Ser. No. 10/405,421, filed Apr. 1, 2003, now U.S. Pat. No. 7,011,565, which is a continuation of U.S. patent application Ser. No. 09/863,118, filed May 22, 2001, now U.S. Pat. No. 6,910,944, which is a continuation of U.S. patent application Ser. No. 09/519,156, filed Mar. 6, 2000, now U.S. Pat. No. 6,280,290, which is a continuation of U.S. patent application Ser. No. 09/258,504, filed Feb. 26, 1999, now U.S. Pat. No. 6,045,439, which is a continuation of U.S. patent application Ser. No. 08/689,930, filed Aug. 16, 1996, now U.S. Pat. No. 5,893,796, which is a continuation-in-part of U.S. patent application Ser. No. 08/605,769, filed Feb. 22, 1996, now U.S. Pat. No. 5,964,643, which is a continuation-in-part of U.S. patent application Ser. No. 08/413,982, filed Mar. 28, 1995, abandoned. The disclosure of each prior application is considered part of and is incorporated by reference in the disclosure of this application.

BACKGROUND

This invention relates generally to semiconductor manufacture, and more particularly to a method for forming a transparent window in a polishing pad for use in chemical mechanical polishing (CMP).

In the process of fabricating modern semiconductor integrated circuits (ICs), it is necessary to form various material layers and structures over previously formed layers and structures. However, the prior formations often leave the top surface topography of an in-process wafer highly irregular, with bumps, areas of unequal elevation, troughs, trenches, and/or other surface irregularities. These irregularities cause problems when forming the next layer. For example, when printing a photolithographic pattern having small geometries over previously formed layers, a very shallow depth of focus is required. Accordingly, it becomes essential to have a flat and planar surface, otherwise, some parts of the pattern will be in focus and other parts will not. In fact, surface variations on the order of less than 1000 Å over a 25×25 mm die would be preferable. In addition, if the irregularities are not leveled at each major processing step, the surface topography of the wafer can become even more irregular, causing further problems as the layers stack up during further processing. Depending on the die type and the size of the geometries involved, the surface irregularities can lead to poor yield and device performance. Consequently, it is desirable to effect some type of planarization, or leveling, of the IC structures. In fact, most high density IC fabrication techniques make use of some method to form a planarized wafer surface at critical points in the manufacturing process.

One method for achieving semiconductor wafer planarization or topography removal is the chemical mechanical polishing (CMP) process. In general, the chemical mechanical polishing (CMP) process involves holding and/or rotating the wafer against a rotating polishing platen under a controlled pressure. As shown in FIG. 1, a typical CMP apparatus 10 includes a polishing head 12 for holding the semiconductor wafer 14 against the polishing platen 16. The polishing platen 16 is covered with a pad 18. This pad 18 typically has a backing layer 20 which interfaces with the surface of the platen and a covering layer 22 which is used in conjunction with a chemical polishing slurry to polish the wafer 14. However, some pads have only a covering layer and no backing layer. The covering layer 22 is usually either an open cell foamed polyurethane (e.g. Rodel IC 1000) or a sheet of polyurethane with a grooved surface (e.g. Rodel EX2000). The pad material is wetted with the chemical polishing slurry containing both an abrasive and chemicals. One typical chemical slurry includes KOH (Potassium Hydroxide) and fumed-silica particles. The platen is usually rotated about its central axis 24. In addition, the polishing head is usually rotated about its central axis 26, and translated across the surface of the platen 16 via a translation arm 28. Although just one polishing head is shown in FIG. 1, CMP devices typically have more than one of these heads spaced circumferentially around the polishing platen.

A particular problem encountered during a CMP process is in the determination that a part has been planarized to a desired flatness or relative thickness. In general, there is a need to detect when the desired surface characteristics or planar condition has been reached. This has been accomplished in a variety of ways. Early on, it was not possible to monitor the characteristics of the wafer during the CMP process. Typically, the wafer was removed from the CMP apparatus and examined elsewhere. If the wafer did not meet the desired specifications, it had to be reloaded into the CMP apparatus and reprocessed. This was a time consuming and labor-intensive procedure. Alternately, the examination might have revealed that an excess amount of material had been removed, rendering the part unusable. There was, therefore, a need in the art for a device which could detect when the desired surface characteristics or thickness had been achieved, in-situ, during the CMP process.

Several devices and methods have been developed for the in-situ detection of endpoints during the CMP process. For instance, devices and methods that are associated with the use of ultrasonic sound waves, and with the detection of changes in mechanical resistance, electrical impedance, or wafer surface temperature, have been employed. These devices and methods rely on determining the thickness of the wafer or a layer thereof, and establishing a process endpoint, by monitoring the change in thickness. In the case where the surface layer of the wafer is being thinned, the change in thickness is used to determine when the surface layer has the desired depth. And, in the case of planarizing a patterned wafer with an irregular surface, the endpoint is determined by monitoring the change in thickness and knowing the approximate depth of the surface irregularities. When the change in thickness equals the depth of the irregularities, the CMP process is terminated. Although these devices and methods work reasonably well for the applications for which they were intended, there is still a need for systems which provide a more accurate determination of the endpoint.

SUMMARY OF THE INVENTION

In general, in one aspect, a method of polishing a substrate is described. The substrate is held on a polishing pad with a polishing head, wherein the polishing pad is supported by a platen. A relative motion is created between the substrate and the polishing pad to polish a side of the substrate. A light beam is generated. The light beam is directed towards the substrate to cause the light beam to impinge on the side of the substrate being polished. Light reflected from the substrate is received at a detector to generate an interference signal. A measure of uniformity is computed from the interference signal.

In general, in another aspect, a method of polishing a substrate is described. The substrate is held on a polishing pad with a polishing head, wherein the polishing pad is supported by a platen. Relative motion is created between the substrate and the polishing pad to polish a side of the substrate. A light beam is generated. The light beam is directed towards the substrate to cause the light beam to impinge on the side of the substrate being polished. Light reflected from the substrate is received at a detector to generate an interference signal. A characterizing waveform for an operator to see, the characterizing waveform presenting data for a period of time that extends over multiple cycles of the interference signal.

Additional objects and advantages of the invention will be set forth in the description which follows, and in part will be obvious from the description, or may be learned by practice of the invention. The objects and advantages of the invention may be realized by means of the instrumentalities and combinations particularly pointed out in the claims.

BRIEF DESCRIPTION OF THE DRAWING

The accompanying drawings, which are incorporated and constitute a part of the specification, schematically illustrate an embodiment of the invention, and together with the general description given above and the detailed description given below, serve to explain the principles of the invention.

FIGS. 11A-C are simplified cross-sectional views of a patterned wafer with an irregular surface being processed by the apparatus of FIG. 2, wherein FIG. 11A shows the wafer at the beginning of the CMP process, FIG. 11B shows the wafer about midway through the process, and FIG. 11C shows the wafer close to the point of planarization.

DESCRIPTION OF THE PREFERRED EMBODIMENT(S)

Figure 1:
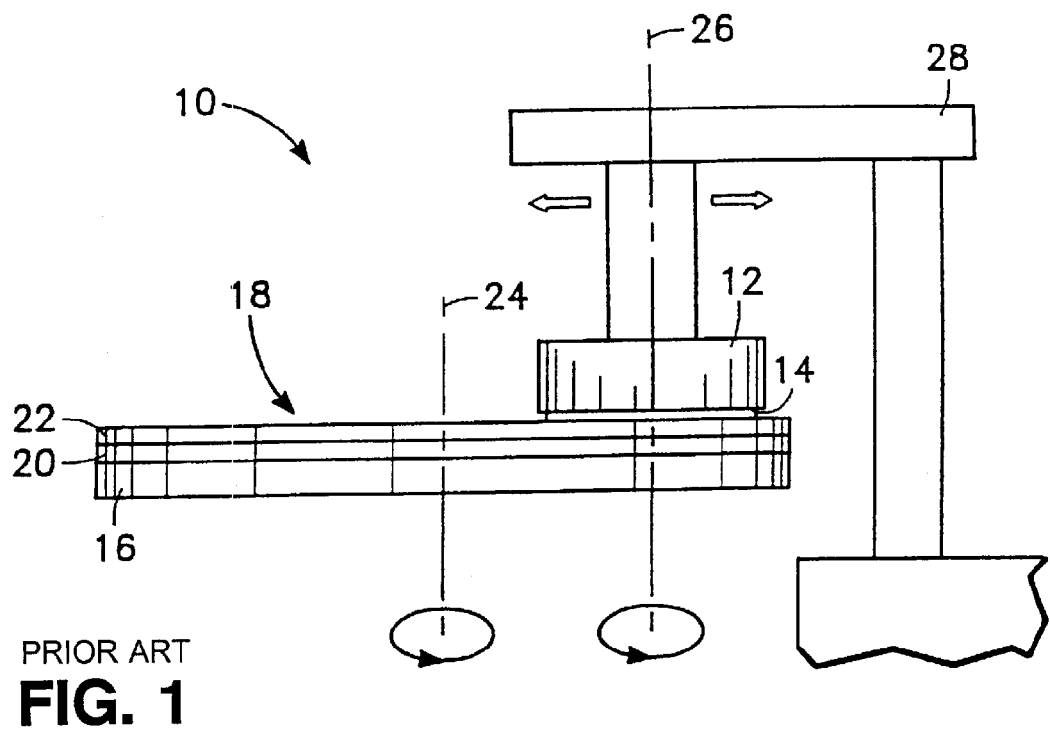
FIG. 1 is a side view of a chemical mechanical polishing (CMP) apparatus typical of the prior art.
Figure 2:
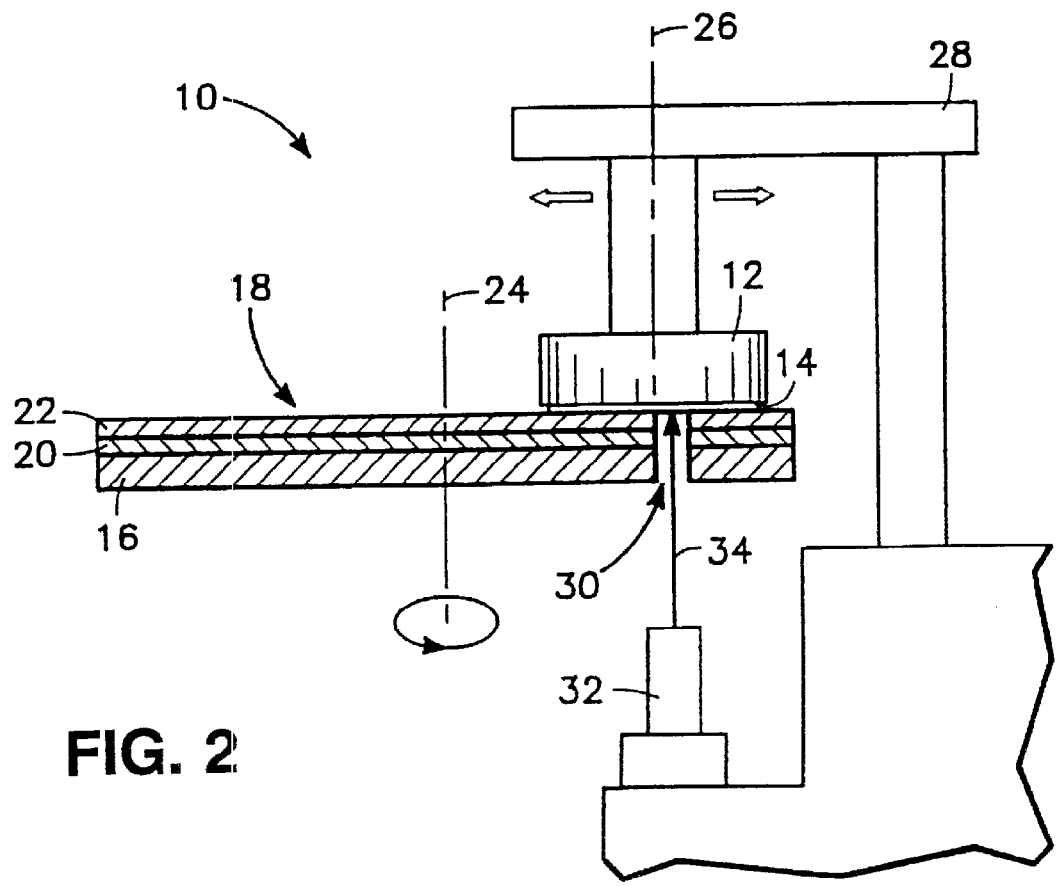
FIG. 2 is a side view of a chemical mechanical polishing apparatus with endpoint detection constructed in accordance with the present invention.

FIG. 2 depicts a portion of a CMP apparatus modified in accordance with one embodiment of the present invention. A hole 30 is formed in the platen 16 and the overlying platen pad 18. This hole 30 is positioned such that it has a view of the wafer 14 held by a polishing head 12 during a portion of the platen's rotation, regardless of the translational position of the head 12. A laser interferometer 32 is fixed below the platen 16 in a position enabling a laser beam 34 projected by the laser interferometer 32 to pass through the hole 30 in the platen 16 and strike the surface of the overlying wafer 14 during a time when the hole 30 is adjacent the wafer 14.

Figure 3A:
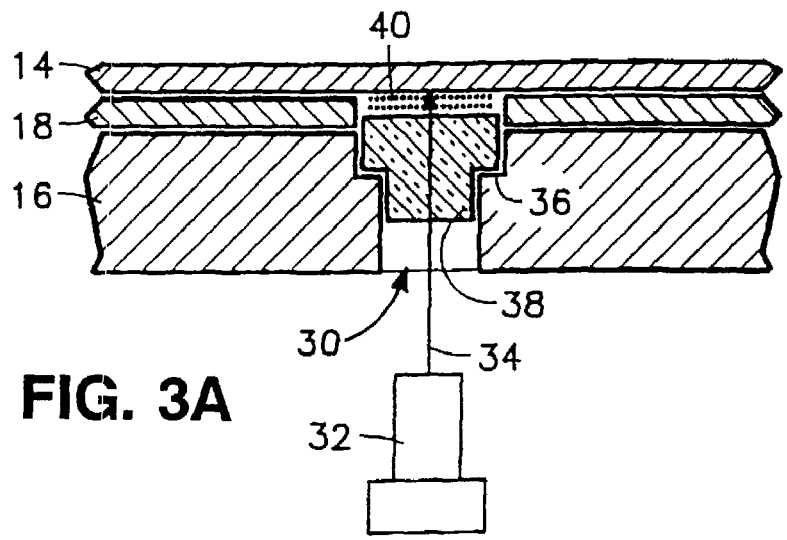
FIGS. 3A-D are simplified cross-sectional views of respective embodiments of the window portion of the apparatus of FIG. 2.
Figure 3B:
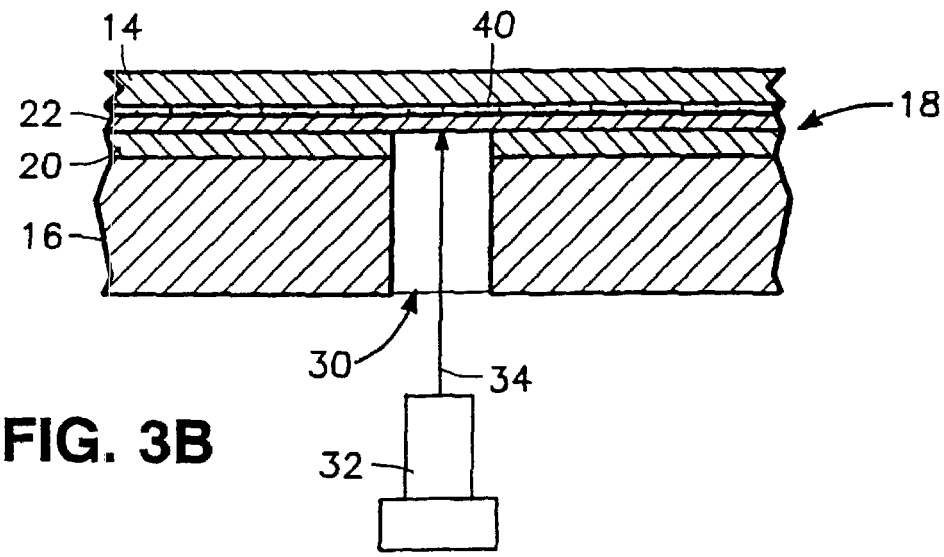
Figure 3C:
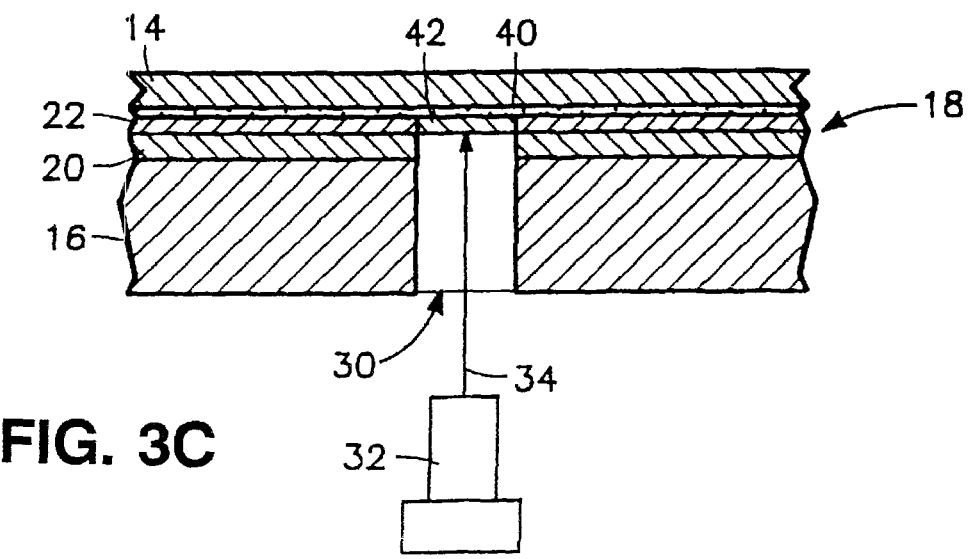

A detailed view of the platen hole 30 and wafer 14 (at a time when it overlies the platen hole 30) are shown in FIGS. 3A-C. As can be seen in FIG. 3A, the platen hole 30 has a stepped diameter, thus forming a shoulder 36. The shoulder 36 is used to contain and hold a quartz insert 38 which functions as a window for the laser beam 34. The interface between the platen 16 and the insert 38 is sealed, so that the portion of the chemical slurry 40 finding its way between the wafer 14 and insert 38 cannot leak through to the bottom of the platen 16. The quartz insert 38 protrudes above the top surface of the platen 16 and partially into the platen pad 18. This protrusion of the insert 38 is intended to minimize the gap between the top surface of the insert 38 and the surface of the wafer 14. By minimizing this gap, the amount of slurry 40 trapped in the gap is minimized. This is advantageous because the slurry 40 tends to scatter light traveling through it, thus attenuating the laser beam emitted from the laser interferometer 32. The thinner the layer of slurry 40 between the insert 38 and the wafer 14, the less the laser beam 34 and light reflected from the wafer, is attenuated. It is believed a gap of approximately 1 mm would result in acceptable attenuation values during the CMP process. However, it is preferable to make this gap even smaller. The gap should be made as small as possible while still ensuring the insert 38 does not touch the wafer 14 at any time during the CMP process. In a tested embodiment of the present invention, the gap between the insert 38 and wafer 14 was set at 10 mils (250 µm) with satisfactory results.

FIG. 3B shows an alternate embodiment of the platen 16 and pad 18. In this embodiment, the quartz insert has been eliminated and no through-hole exists in the pad 18. Instead, the backing layer 20 (if present) of the pad 18 has been removed in the area overlying the hole 30 in the platen 16. This leaves only the polyurethane covering layer 22 of the pad 18 between the wafer 14 and the bottom of the platen 16. It has been found that the polyurethane material used in the covering layer 22 will substantially transmit the laser beam 34 from the laser interferometer 32. Thus, the portion of the covering layer 22 which overlies the platen hole 30 functions as a window for the laser beam 34. This alternate arrangement has significant advantages. First, because the pad 18 itself is used as the window, there is no appreciable gap. Therefore, very little of the slurry 40 is present to cause the detrimental scattering of the laser beam. Another advantage of this alternate embodiment is that pad wear becomes irrelevant. In the first-described embodiment of FIG. 3A, the gap between the quartz insert 38 and the wafer 14 was made as small as possible. However, as the pad 18 wears, this gap tends to become even smaller. Eventually, the wear could become so great that the top surface of the insert 38 would touch the wafer 14 and damage it. Since the pad 18 is used as the window in the alternate embodiment of FIG. 3B, and is designed to be in contact with the wafer 14, there are no detrimental effects due to the wearing of the pad 18. It is noted that tests using both the opaque open-cell and transparent grooved surface types of pads have shown that the laser beam is less attenuated with the transparent grooved surface pad. Accordingly, it is preferable that this type of pad be employed.

Although the polyurethane material used in the covering layer of the pad is substantially transmissive to the laser beam, it does contain certain additives, such as nylon microspheres, which inhibit its transmissiveness. This problem is eliminated in the embodiment of the invention depicted in FIG. 3C. In this embodiment, the typical pad material in the region overlying the platen hole 30 has been replaced with a solid polyurethane plug 42. This plug 42, which functions as the window for the laser beam, is made of a polyurethane material which lacks the nylon microspheres. Accordingly, the attenuation of the laser beam 34 through the plug 42 is minimized. The plug 42 may be integrally molded into the pad 18.

For example, the plug may be formed by pouring liquid polyurethane into a hole that has been cut in the polishing pad. The liquid polyurethane is cured to form a plug which is integrally molded into the polishing pad. Alternately, the plug 42 could be preformed as a solid insert. This insert could be placed in the bulk molten polishing pad material, and then the entire assembly could be cured so that the material of the plug 42 and the material of the polishing pad 18 bond together. When the assembly is cooled, the polyurethane plug 42 would be integrally molded into the polishing pad. However, the material of the polishing pad 18, and specifically the covering layer 22, is different from the material of the polyurethane plug 42. Therefore when the assembly is cured, the material of the plug 42 tends to contract and buckle the window up or down. This causes either a cup which can accumulate slurry or a bump which can damage the wafer 14.

Figure 3D:
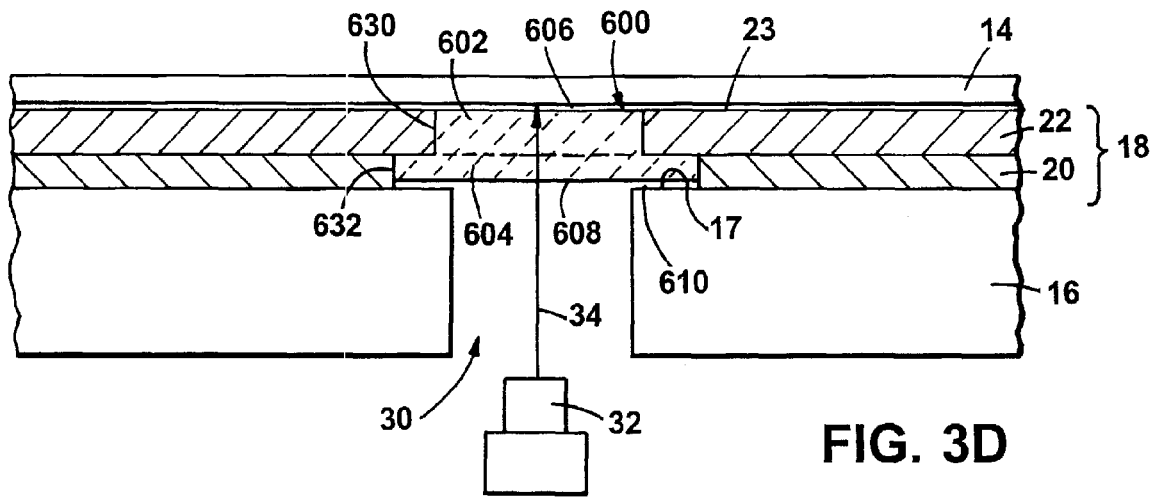

Referring to FIGS. 3D, in another embodiment, a two-level plug 600 is positioned in the polishing pad 18 above the platen hole 30. The two-level plug 600 is formed of a relatively transparent material which acts as a window for the laser beam. The material of the two-level plug 600 may be a substantially pure polyurethane available from Rodel of Newark, New Jersey, under the product name EX-2000. Such a material is chemically inert vis-a-vis the polishing process, and erodes at the same rate as the polishing pad. The two-level plug 600 includes an upper plug portion 602 and a lower plug portion 604. The upper plug portion 602 fits into a hole or opening 630 in the covering layer 22 and the lower plug portion 604 fits into a hole or opening 632 in the backing layer 20. The top surface 606 of the upper plug portion 602 is co-planar with the top surface 23 of the polishing pad 18. There may be a gap 610 between the lower surface 608 of the lower plug portion 604 and the top surface 17 of the platen 16.

The application of a load from the wafer 14 on the polishing pad 18 will cause the backing layer 20 to compress. Thus, the width of the gap 610 will decrease. The gap 610 is selected to be sufficiently wide that the lower surface 608 will not contact the upper surface 17 of the platen 16, even if the wafer 14 is positioned over the platen hole 30. The top surface 606 contacts the wafer 14 but, due to the gap 610, does not exert pressure on it. Therefore, the denser material of the two-level plug 600 does not create a locally increased load. Thus, the two-level plug 600 does not adversely affect the polishing of the wafer 14.

Figure 3E:
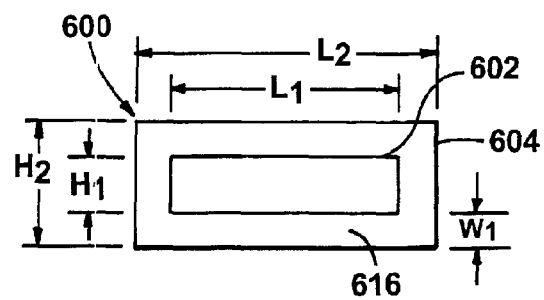
FIG. 3E is a simplified top view of the transparent plug used in the window portion of FIG. 3D.
Figure 3F:
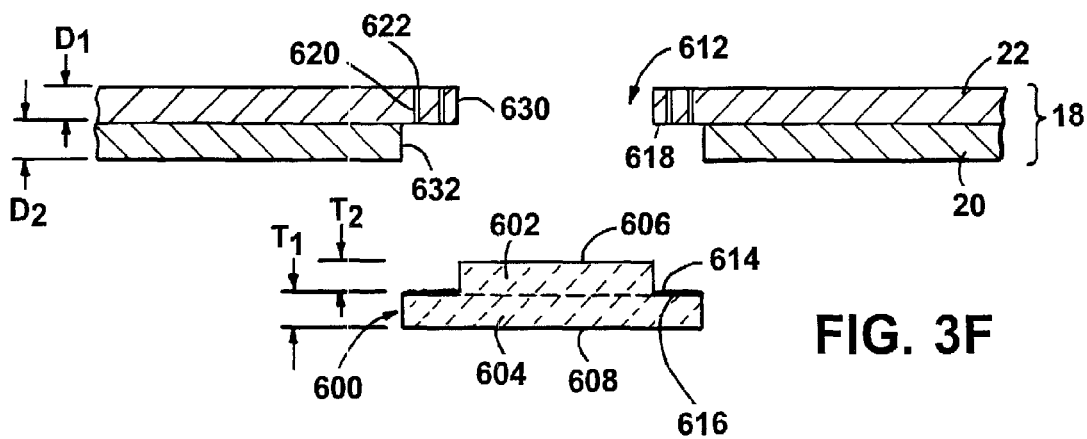
FIG. 3F is a simplified cross-sectional view illustrating the assembly of the window portion of FIG. 3D.

Referring to FIGS. 3E and 3F, the polishing pad 18 may be assembled as follows. The two-level plug 600 is machined or molded from a solid piece of polyurethane. An aperture 612 is cut into a polishing pad 18. Alternately, the polishing pad 18 may be integrally molded with the aperture 612. The aperture 612 includes two sections. The first section of the aperture may be the hole 630 in covering layer 22 and the second section of the aperture may be the hole 632 in the backing layer 20. The aperture 612 matches the shape of two-level plug 600. The plug may be in the form of adjacent rectangular slabs having different cross-sectional areas. Specifically, the cross-sectional area of the lower plug portion 604 may be larger than the cross-sectional area of the upper plug portion 602. The upper plug portion 602 may have a length $L_1$ of about 2.0 inches and a height $H_1$ of about 0.5 inches The lower plug portion 604 may have a length $L_2$ of about 2.2 inches and a height $H_2$ of about 0.7 inches. Thus, the lower plug portion 604 extends beyond the upper plug portion 602 to form a rim 616 having a width $W_1$ of about 0.1 inches. The plug may be oriented so that its longitudinal axis lies along a radius of the polishing pad.

Although FIGS. 3D-F show the upper plug portion 602 as having a smaller cross-sectional area than the lower plug portion 604, this is not necessary. Instead, the upper plug portion 602 may be larger than the lower plug portion 604. The upper plug portion 602 has a thickness $T_1$ equal to the thickness of covering layer 22, i.e., about fifty mils. Thus, the thickness $T_1$ is equal to the depth $D_1$ of the first section of the aperture. The lower plug portion 604 is thinner than the backing layer 20 by about ten mils. The lower plug portion 604 may have a thickness $T_2$ of about forty mils. Thus, the thickness $T_2$ is less than the depth $D_2$ of the second section of the aperture.

An adhesive material 614 is placed on the rim 616 of the lower plug portion 604. The adhesive material 614 may be an elastomeric polyurethane available from Berman Industries of Van Nuys, Calif. under the trade name WC-575 A/B. Other adhesive materials, such as rubber cement or an epoxy, may also be used for the adhesive material 614.

An area 618 on the underside of covering layer 22 is cleaned by scraping off any adhesive debris and washing the area with acetone. Then the two-level plug 600 is inserted into the aperture 612 until the rim 616 of plug 600 contacts the area 618 of the polishing pad 18. This contact area is placed under a load of approximately fifteen to twenty pounds per square inch. This forces the adhesive material 614 into the gaps between upper plug portion 602 and covering layer 22 or between lower plug portion 604 and backing layer 20. After a few days at room temperature, the adhesive material 614 will have cured and the plug 600 will be fixed in the aperture 612. The adhesive material 614 could be cured more quickly by the application of heat, but an excessive temperature may deform the backing material 20.

There may be grooves or pores 620 cut into the covering layer 22 of the polishing pad 18 to provide for improved slurry distribution. These grooves or pores 620, which are located above the lower plug portion 604, are filled with a pure polyurethane material 622. In addition, the top surface 606 of the two-level plug 600 is left ungrooved. Because there are no grooves or depressions in the area of the two-level plug 600, there is no accumulation of slurry which could block the laser beam 34. During the conditioning process, in which a pad conditioner grinds away the top surface 23 of the covering layer 22 to restore the roughness of the polishing pad 18, the top surface 606 of two-level plug 600 will be scratched and abraded. Because polyurethane is a diffusive material, the abrasion of the top surface 606 will not significantly affect the performance of the laser interferometer 32.

The window provided by the two-level plug 600 prevents the accumulation of slurry above the platen hole 30 which could block the laser beam 34. The plug 600 is formed of a material which is chemically resistant to the slurry 40 and is chemically inert vis-a-vis the polishing process. The plug erodes at the same rate as the rest of the polishing pad 18. The plug is sealed within the aperture to prevent the leakage of the slurry 40 into the platen hole 30, and the plug may be depressed to prevent the wafer from experiencing a locally increased load.

In operation, a CMP apparatus in accordance with the present invention uses the laser beam from the laser interferometer to determine the amount of material removed from the surface of the wafer, or to determine when the surface has become planarized. The beginning of this process will be explained in reference to FIG. 4. It is noted that a laser and collimator 44, beam splitter 46, and detector 48 are depicted as elements of the laser interferometer 32. This is done to facilitate the aforementioned explanation of the operation of the CMP apparatus. In addition, the embodiment of FIG. 3A employing the quartz insert 38 as a window is shown for convenience. Of course, the depicted configuration is just one possible arrangement, others can be employed. For instance, any of the aforementioned window arrangements could be employed, and alternate embodiments of the laser interferometer 32 are possible. One alternate interferometer arrangement would use a laser to produce a beam which is incident on the surface of the wafer at an angle. In this embodiment, a detector would be positioned at a point where light reflecting from the wafer would impinge upon it. No beam splitter would be required in this alternate embodiment.

Figure 4:
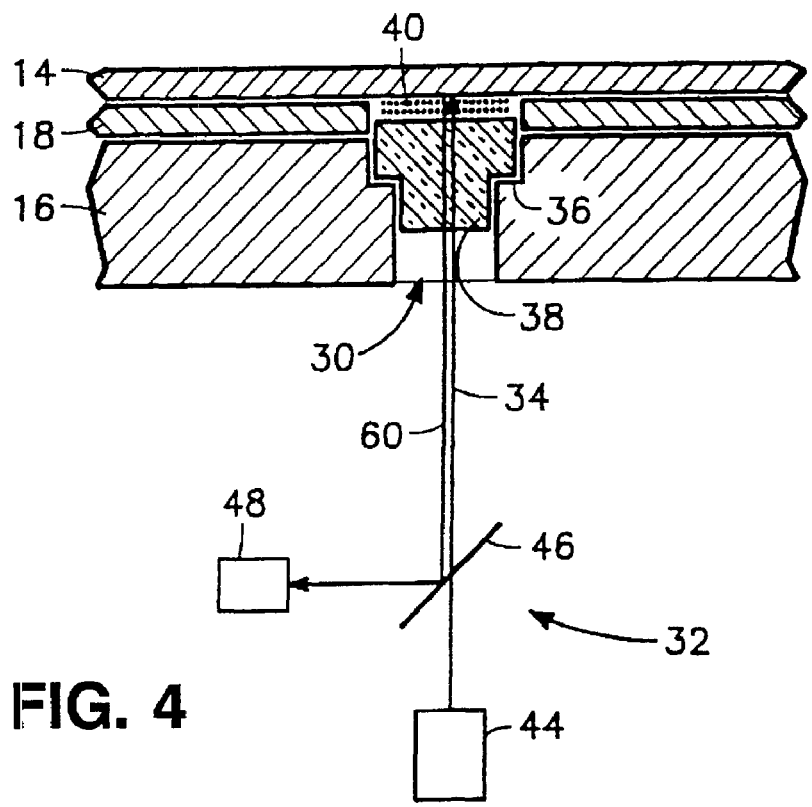
FIG. 4 is a simplified cross-sectional view of a window portion of the apparatus of FIG. 2, showing components of a laser interferometer generating a laser beam and detecting a reflected interference beam.

As illustrated in FIG. 4, the laser and collimator 44 generate a collimated laser beam 34 which is incident on the lower portion of the beam splitter 46. A portion of the beam 34 propagates through the beam splitter 46 and the quartz insert 38. Once this portion of beam 34 leaves the upper end of the insert 38, it propagates through the slurry 40, and impinges on the surface of the wafer 14. The wafer 14, as shown in detail in FIG. 5 has a substrate 50 made of silicon and an overlying oxide layer 52 (i.e. $SiO_2$).

The portion of the beam 34 which impinges on the wafer 14 will be partially reflected at the surface of the oxide layer 52 to form a first reflected beam 54. However, a portion of the light will also be transmitted through the oxide layer 52 to form a transmitted beam 56 which impinges on the underlying substrate 50. At least some of the light from the transmitted beam 56 reaching the substrate 50 will be reflected back through the oxide layer 52 to form a second reflected beam 58. The first and second reflected beams 54, 58 interfere with each other constructively or destructively depending on their phase relationship, to form a resultant beam 60, where the phase relationship is primarily a function of the thickness of the oxide layer 52.

Although, the above-described embodiment employs a silicon substrate with a single oxide layer, those skilled in the art will recognize the interference process would also occur with other substrates and other oxide layers. The key is that the oxide layer partially reflects and partially transmits, and the substrate at least partially reflects, the impinging beam. In addition, the interference process may also be applicable to wafers with multiple layers overlying the substrate. Again, if each layer is partially reflective and partially transmissive, a resultant interference beam will be created, although it will be a combination of the reflected beams from all the layer and the substrate.

Referring again to FIG. 4, it can be seen the resultant beam 60 representing the combination of the first and second reflected beams 54, 58 (FIG. 5) propagates back through the slurry 40 and the insert 38, to the upper portion of the beam splitter 46. The beam splitter 46 diverts a portion of the resultant beam 60 towards the detector 48.

Figure 6:
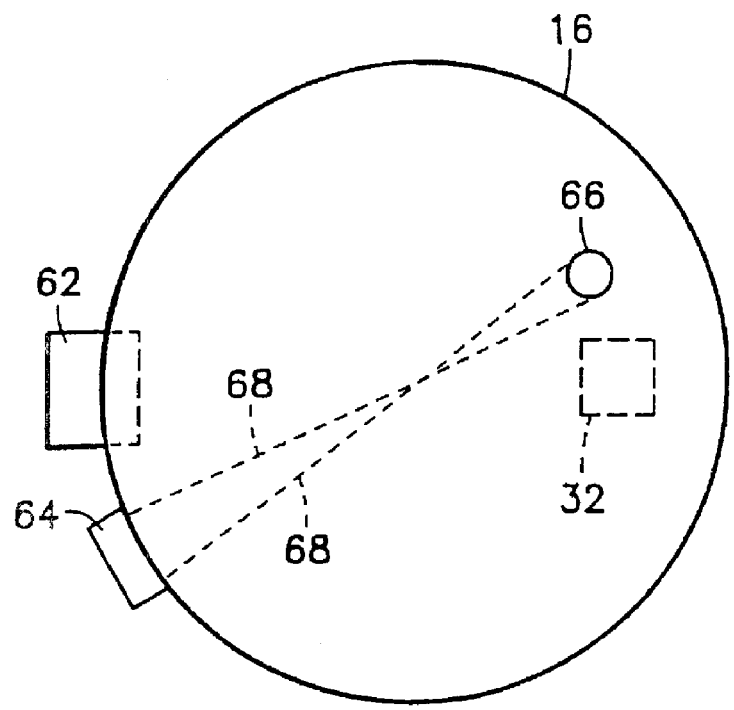
FIG. 6 is a simplified top view of the platen of the apparatus of FIG. 2, showing one possible relative arrangement between the window and sensor flag, and the sensor and laser interferometer.

The platen 16 will typically be rotating during the CMP process. Therefore, the platen hole 30 will only have a view of the wafer 14 during part of its rotation. Accordingly, the detection signal from the laser interferometer 32 should only be sampled when the wafer 14 is impinged by the laser beam 34. It is important that the detection signal not be sampled when the laser beam 34 is partially transmitted through the hole 30, as when a portion is blocked by the bottom of the platen 16 at the hole's edge, because this will cause considerable noise in the signal. To prevent this from happening, a position sensor apparatus has been incorporated. Any well known proximity sensor could be used, such as Hall effect, eddy current, optical interrupter, or acoustic sensor, although an optical interrupter type sensor was used in the tested embodiments of the invention and will be shown in the figures that follow. An apparatus accordingly to the present invention for synchronizing the laser interferometer 32 is shown in FIG. 6, with an optical interrupter type sensor 62 (e.g. LED/photodiode pair) mounted on a fixed point on the chassis of the CMP device such that it has a view of the peripheral edge of the platen 16. This type of sensor 62 is activated when an optical beam it generates is interrupted. A position sensor flag 64 is attached to the periphery of the platen 16. The point of attachment and length of the flag 64 is made such that it interrupts the sensor's optical signal only when the laser beam 34 from the laser interferometer 32 is completely transmitted through the previously-described window structure 66. For example, as shown in FIG. 6, the sensor 62 could be mounted diametrically opposite the laser interferometer 32 in relation to the center of the platen 16. The flag 64 would be attached to the platen 16 in a position diametrically opposite the window structure 66. The length of the flag 64 would be approximately defined by the dotted lines 68, although, the exact length of the flag 64 would be fine tuned to ensure the laser beam is completely unblocked by the platen 16 during the entire time the flag 64 is sensed by the sensor 62. This fine tuning would compensate for any position sensor noise or inaccuracy, the responsiveness of the laser interferometer 32, etc. Once the sensor 62 has been activated, a signal is generated which is used to determine when the detector signal from the interferometer 32 is to be sampled.

Data acquisition systems capable of using the position sensor signal to sample the laser interferometer signal during those times when the wafer is visible to the laser beam, are well known in the art and do not form a novel part of the present invention. Accordingly, a detailed description will not be given herein. However some considerations should be taken into account in choosing an appropriate system. For example, it is preferred that the signal from the interferometer be integrated over a period of time. This integration improves the signal-to-noise ratio by averaging the high frequency noise over the integration period. This noise has various causes, such as vibration from the rotation of the platen and wafer, and variations in the surface of the wafer due to unequal planarization. In the apparatus described above the diameter of the quartz window, and the speed of rotation of the platen, will determine how long a period of time is available during any one rotation of the platen to integrate the signal. However, under some circumstances, this available time may not be adequate. For instance, an acceptable signal-to-noise ratio might require a longer integration time, or the interface circuitry employed in a chosen data acquisition system may require a minimum integration time which exceeds that which is available in one pass.

Figure 7:
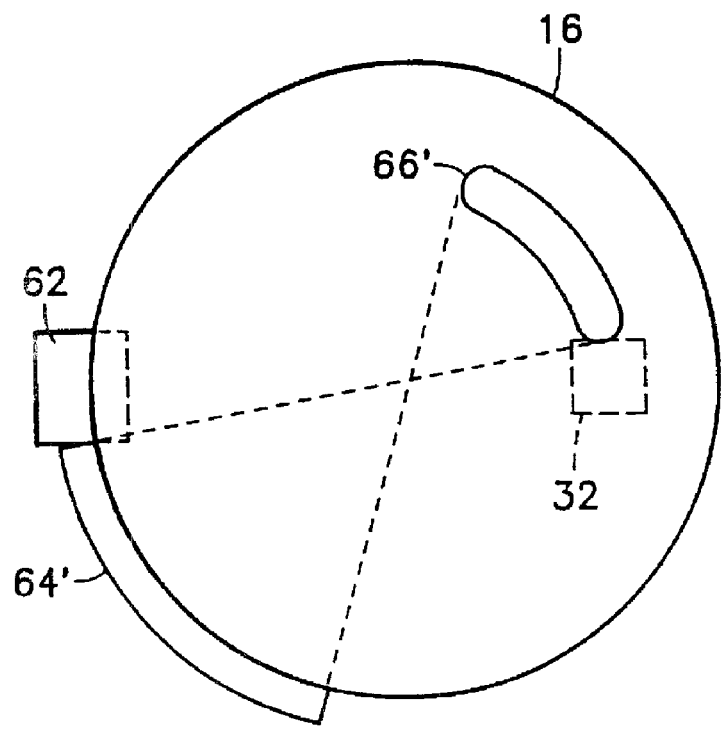
FIG. 7 is a top view of the platen of the apparatus of FIG. 2, showing a relative arrangement between the window and sensor flag, and the sensor and laser, where the window is in the shape of an arc.

One solution to this problem is to extend the platen hole along the direction of rotation of the platen. In other words, the window structure 66' (i.e. insert, pad, or plug) would take on the shape of an arc, as shown in FIG. 7. Of course, the flag 64' is expanded to accommodate the longer window structure 66'. Alternately, the window could remain the same, but the laser interferometer would be mounted to the rotating platen directly below the window. In this case, the CMP apparatus would have to be modified to accommodate the interferometer below the platen, and provisions would have to be made to route the detector signal from the interferometer. However, the net result of either method would be to lengthen the data acquisition time for each revolution of the platen.

Although lengthening the platen hole and window is advantageous, it does somewhat reduce the surface area of the platen pad. Therefore, the rate of planarization is decreased in the areas of the disk which overlie the window during a portion of the platen's rotation. In addition, the length of the platen hole and window must not extend beyond the edges of the wafer, and the data sampling must not be done when the window is beyond the edge of the wafer, regardless of the wafer's translational position. Therefore, the length of the expanded platen hole and window, or the time which the platen-mounted interferometer can be sampled, is limited by any translational movement of the polishing head.

Figure 8:
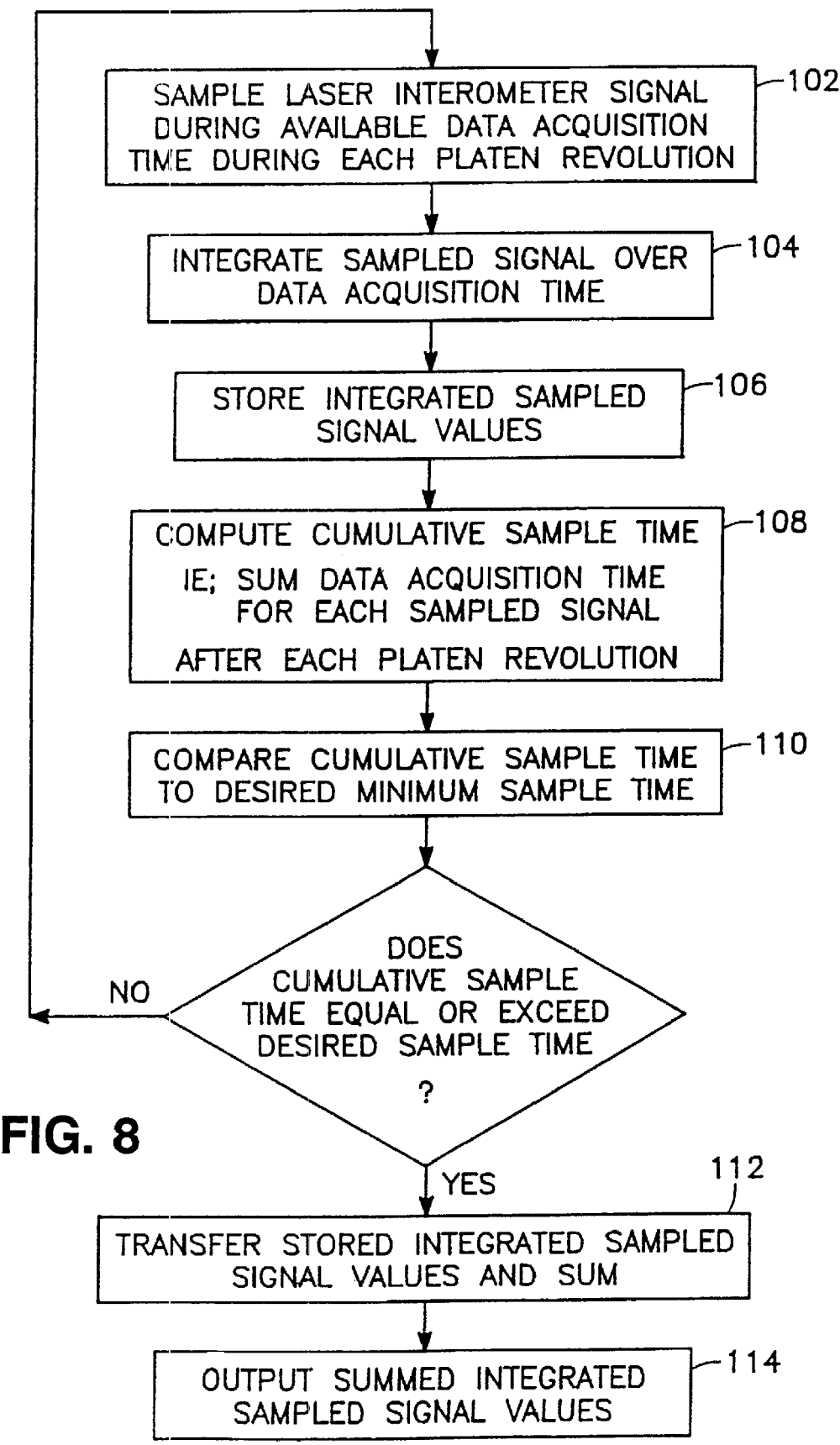
FIG. 8 is a flow chart of a method of piece-wise data acquisition in accordance with the present invention.

Accordingly, a more preferred method of obtaining adequate data acquisition integration time is to collect the data over more than one revolution of the platen. In reference to FIG. 8, during step 102, the laser interferometer signal is sampled during the available data acquisition time in each rotation of the platen. Next, in steps 104 and 106, each sampled signal is integrated over the aforementioned data acquisition time, and the integrated values are stored. Then, in steps 108 and 110, a cumulative sample time is computed after each complete revolution of the platen and compared to a desired minimum sample time. Of course, this would constitute only one sample time if only one sample has been taken. If the cumulative sample time equals or exceeds the desired minimum sample time, then the stored integrated values are transferred and summed, as shown in step 112. If not, the process of sampling, integrating, storing, computing the cumulative sample time, and comparing it to the desired minimum sample time continues. In a final step 114, the summed integrated values created each time the stored integrated values are transferred and summed, are output as a data signal. The just-described data collection method can be implemented in a number of well known ways, employing either logic circuits or software algorithms. As these methods are well known, any detailed description would be redundant and so has been omitted. It is noted that the method of piecewise data collection provides a solution to the problem of meeting a desired minimum sample time no matter what the diameter of the window or the speed of platen rotation. In fact, if the process is tied to the position sensor apparatus, the platen rotation speed could be varied and reliable data would still be obtained. Only the number of platen revolutions required to obtain the necessary data would change.

Figure 5:
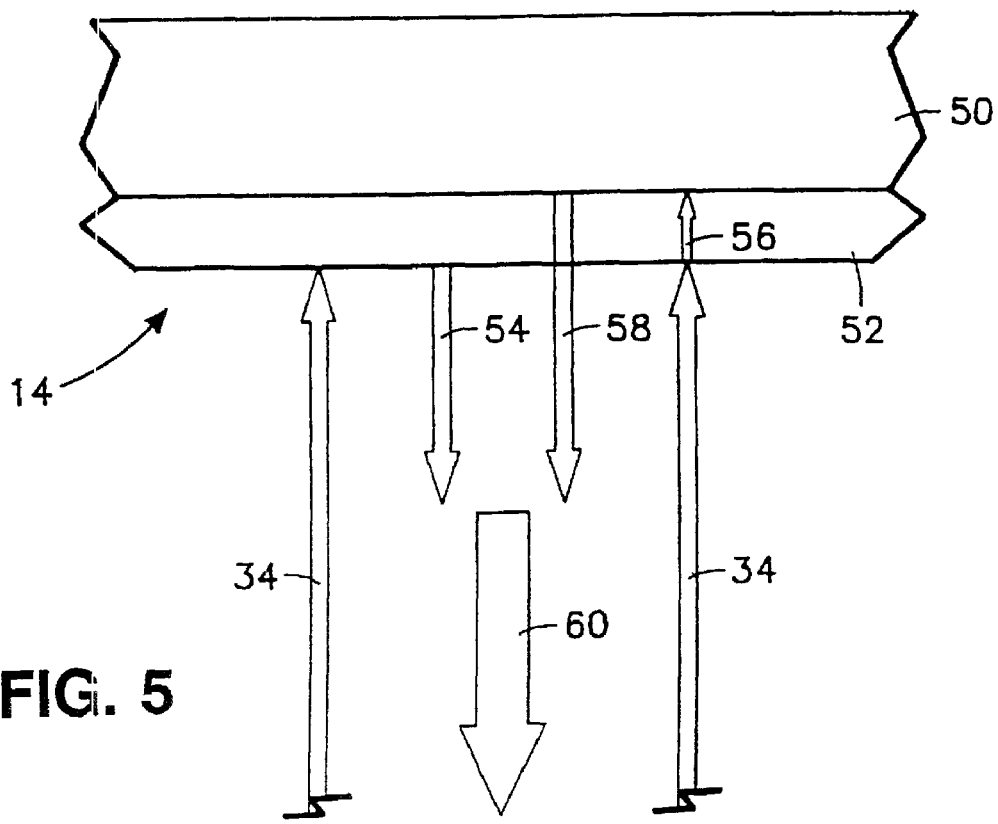
FIG. 5 is a simplified cross-sectional view of a blank oxide wafer being processed by the apparatus of FIG. 2, schematically showing the laser beam impinging on the wafer and reflection beams forming a resultant interference beam.
Figure 9A:
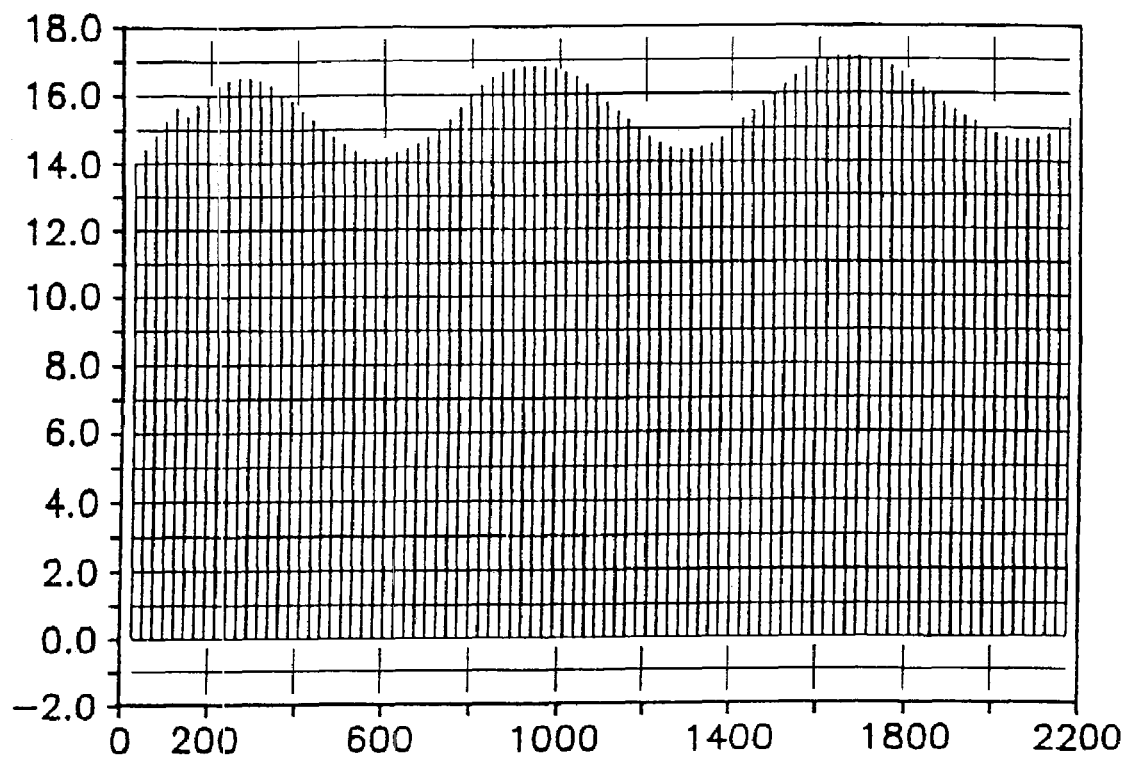
FIGS. 9A-B are graphs showing the cyclic variation in the data signal from the laser interferometer over time during the thinning of a blank oxide wafer. The graph of FIG. 9A shows the integrated values of the data signal integrated over a desired sample time, and the graph of FIG. 9B shows a filtered version of the integrated values.
Figure 9B:
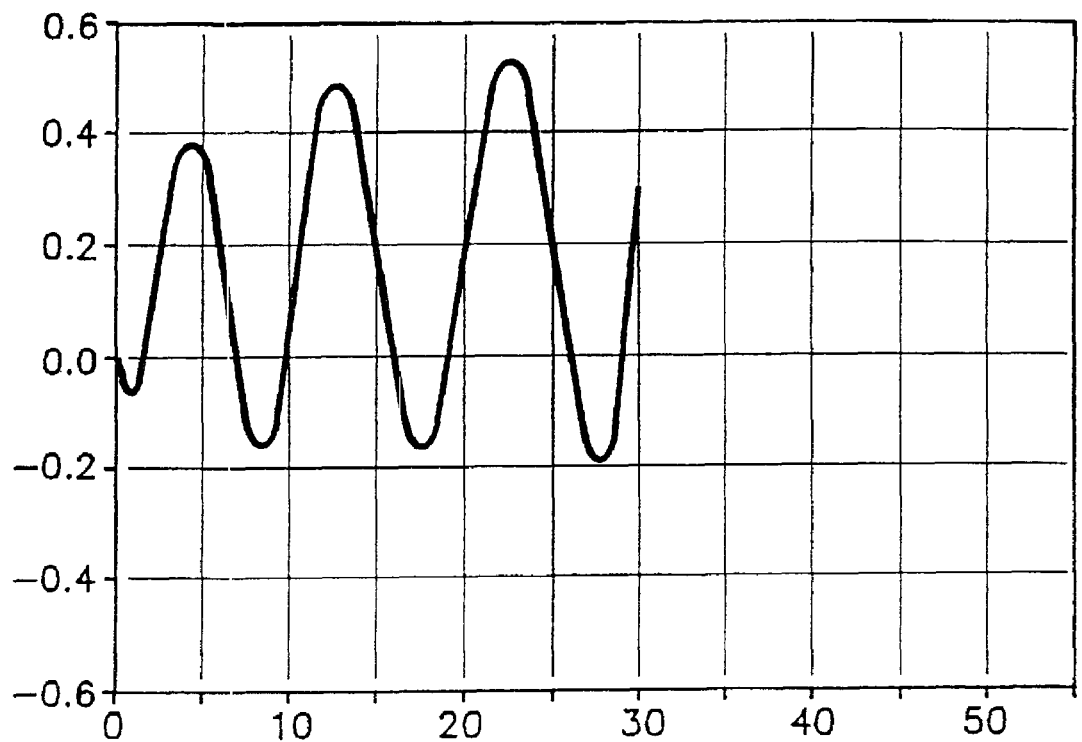
Figure 10A:
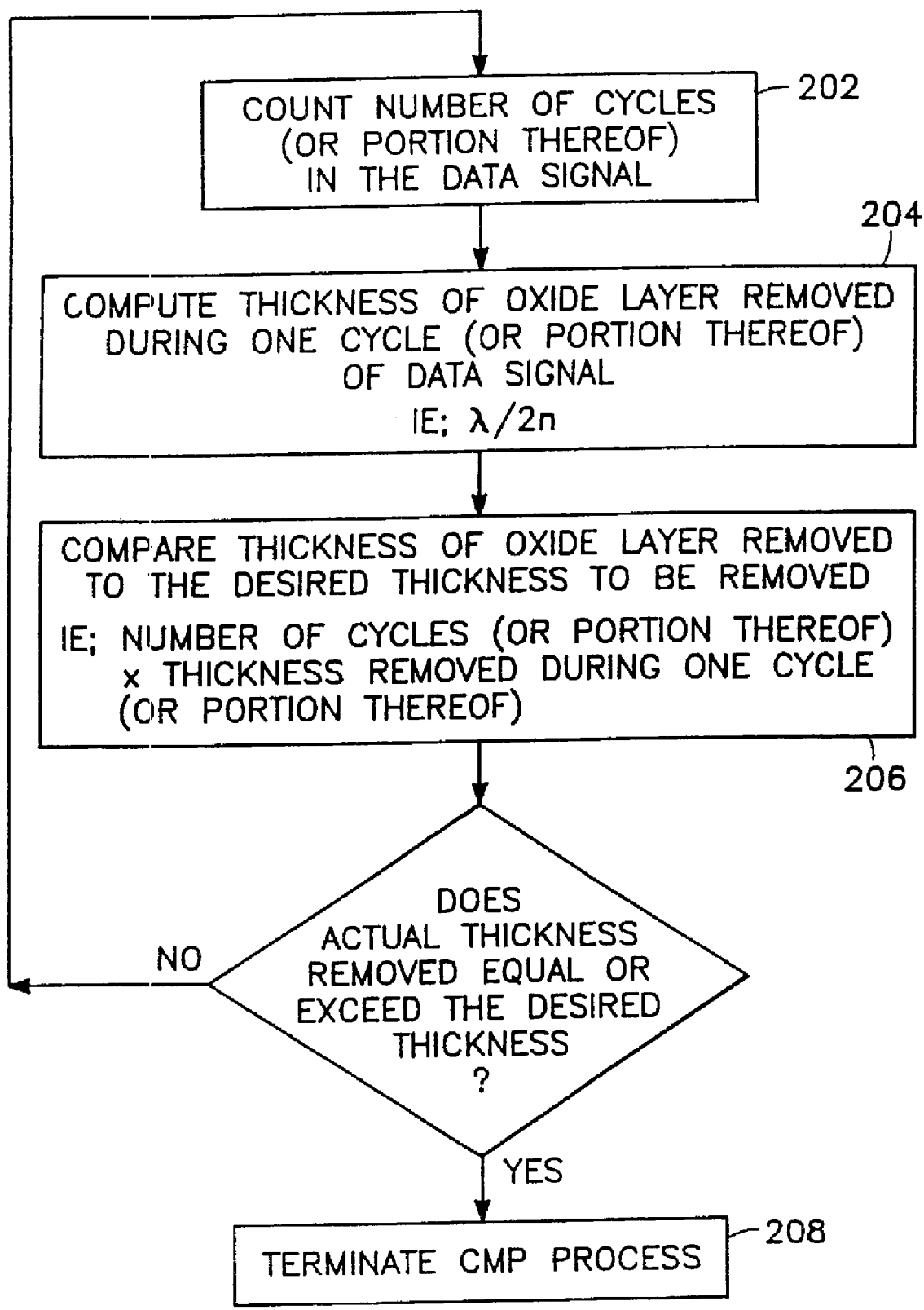
FIG. 10A is a block diagram of a backward-looking method of determining the endpoint of a CMP process to thin the oxide layer of a blank oxide wafer in accordance with the present invention.

The aforementioned first and second reflected beams which formed the resultant beam 60, as shown in FIGS. 4 and 5, cause interference to be seen at the detector 48. If the first and second beams are in phase with each other, they cause a maxima on detector 48. Whereas, if the beams are 180 degrees out of phase, they cause a minima on the detector 48. Any other phase relationship between the reflected beams will result in an interference signal between the maxima and minima being seen by the detector 48. The result is a signal output from the detector 48 that cyclically varies with the thickness of the oxide layer 52, as it is reduced during the CMP process. In fact, it has been observed that the signal output from the detector 48 will vary in a sinusoidal-like manner, as shown in the graphs of FIGS. 9A-B. The graph of FIG. 9A shows the integrated amplitude of the detector signal (y-axis) over each sample period versus time (x-axis). This data was obtained by monitoring the laser interferometer output of the apparatus of FIG. 4, while performing the CMP procedure on a wafer having a smooth oxide layer overlying a silicon substrate (i.e. a blank oxide wafer). The graph of FIG. 9B represents a filtered version of the data from the graph of FIG. 9A. This filtered version shows the cyclical variation in the interferometer output signal quite clearly. It should be noted that the period of the interference signal is controlled by the rate at which material is removed from the oxide layer during the CMP process. Thus, factors such as the downward force placed on the wafer against the platen pad, and the relative velocity between the platen and the wafer determine the period. During each period of the output signal plotted in FIGS. 9A-B, a certain thickness of the oxide layer is removed. The thickness removed is proportional to the wavelength of the laser beam and the index of refraction of the oxide layer. Specifically, the amount of thickness removed per period is approximately $\lambda/2$ n, where X is the freespace wavelength of the laser beam and n is the index of refraction of the oxide layer. Thus, it is possible to determine how much of the oxide layer is removed, in-situ, during the CMP process using the method illustrated in FIG. 10A. First, in step 202, the number of cycles exhibited by the data signal are counted. Next, in step 204, the thickness of the material removed during one cycle of the output signal is computed from the wavelength of the laser beam and the index of refraction of the oxide layer of the wafer. Then, the desired thickness of material to be removed from the oxide layer is compared to the actual thickness removed, in step 206. The actual thickness removed equals the product of the number of cycles exhibited by the data signal and the thickness of material removed during one cycle. In the final step 208, the CMP process is terminated whenever the removed thickness equals or exceeds the desired thickness of material to be removed.

Alternately, less than an entire cycle might be used to determine the amount of material removed. In this way any excess material removed over the desired amount can be minimized. As shown in the bracketed portions of the step 202 in FIG. 10A, the number of occurrences of a prescribed portion of a cycle are counted in each iteration. For example, each occurrence of a maxima (i.e. peak) and minima (i.e. valley), or vice versa, would constitute the prescribed portion of the cycle. This particular portion of the cycle is convenient as maxima and minima are readily detectable via well know signal processing methods. Next, in step 204, after determining how much material is removed during a cycle, this thickness is multiplied by the fraction of a cycle that the aforementioned prescribed portion represents. For example in the case of counting the occurrence of a maxima and minima, which represents one-half of a cycle, the computed one-cycle thickness would be multiplied by one-half to obtain the thickness of the oxide layer removed during the prescribed portion of the cycle. The remaining steps in the method remain unchanged. The net result of this alternate approach is that the CMP process can be terminated after the occurrence of a portion of the cycle. Accordingly, any excess material removed will, in most cases, be less than it would have been if a full cycle where used as the basis for determining the amount of material removed.

Figure 10B:
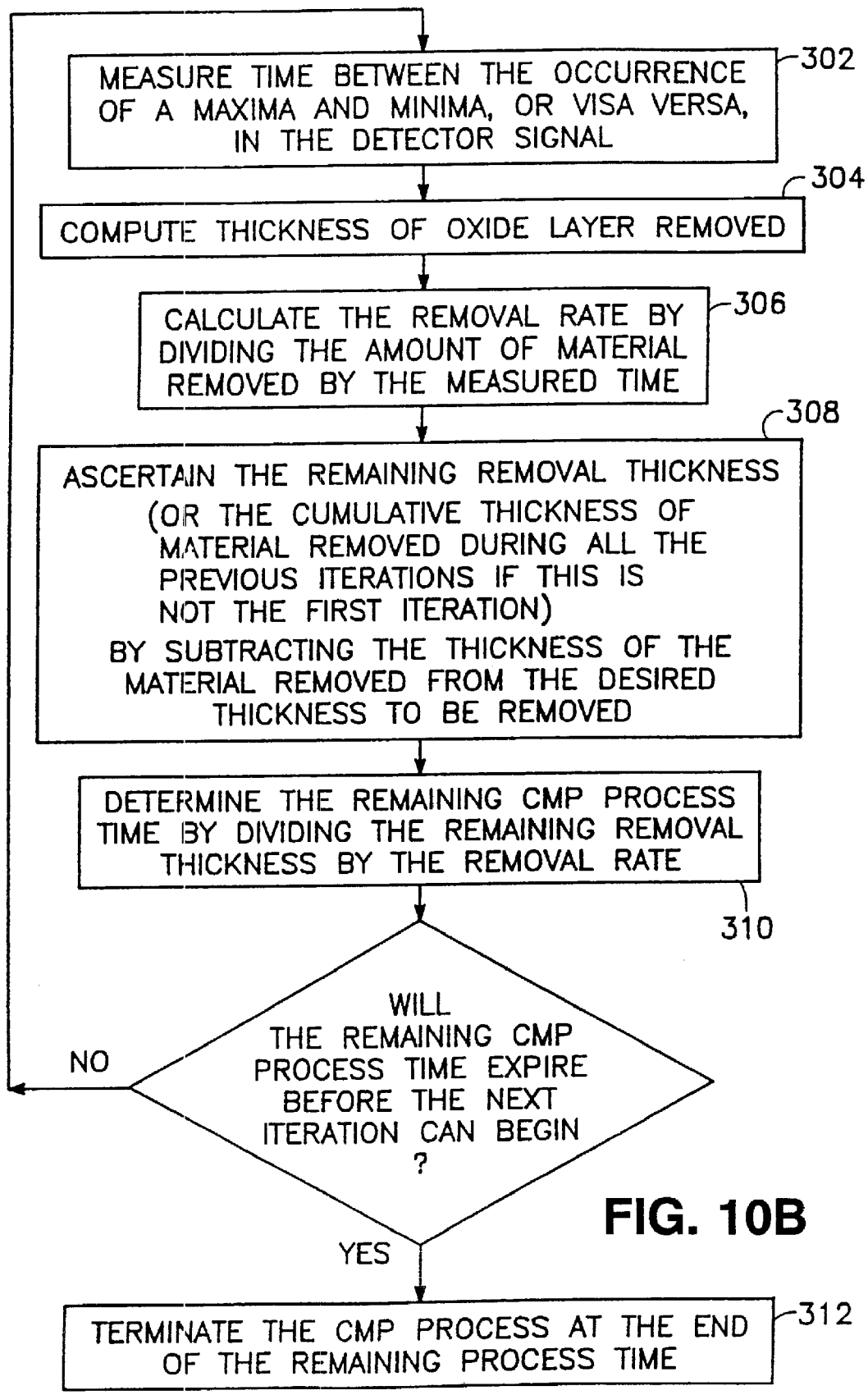
FIG. 10B is a block diagram of a forward-looking method of determining the endpoint of a CMP process to thin the oxide layer of a blank oxide wafer in accordance with the present invention.

The just-described methods look back from the end of a cycle, or portion thereof, to determine if the desired amount of material has been removed. However, as inferred above, the amount of material removed might exceed the desired amount. In some applications, this excess removal of material might be unacceptable. In these cases, an alternate method can be employed which looks forward and anticipates how much material will be removed over an upcoming period of time and terminates the procedure when the desired thickness is anticipated to have been removed. A preferred embodiment of this alternate method is illustrated in FIG. 10B. As can be seen, the first step 302 involves measuring the time between the first occurrence of a maxima and minima, or vice versa, in the detector signal (although an entire cycle or any portion thereof could have been employed). Next, in step 304, the amount of material removed during that portion of the cycle is determined via the previously described methods. A removal rate is then calculated by dividing the amount of material removed by the measured time, as shown in step 306. This constitutes the rate at which material was removed in the preceding portion of the cycle. In the next step 308, the thickness of the material removed as calculated in step 304 is subtracted from the desired thickness to be removed to determine a remaining removal thickness. Then, in step 310, this remaining removal thickness is divided by the removal rate to determine how much longer the CMP process is to be continued before its termination.

It must be noted, however, that the period of the detector signal, and so the removal rate, will typically vary as the CMP process progresses. Therefore, the above-described method is repeated to compensate for this. In other words, once a remaining time has been calculated, the process is repeated for each occurrence of a maxima and minima, or vice versa. Accordingly, the time between the next occurring maxima and minima is measured, the thickness of material removed during the portion of the cycle represented by this occurrence of the maxima and minima (i.e. one-half) is divided by the measured time, and the removal rate is calculated, just as in the first iteration of the method. However, in the next step 308, as shown in brackets, the total amount of material removed during all the previous iterations is determined before being subtracted from the desired thickness. The rest of the method remains the same in that the remaining thickness to be removed is divided by the newly calculated removal rate to determine the remaining CMP process time. In this way the remaining process time is recalculated after each occurrence of the prescribed portion of a cycle of the detector signal. This process continues until the remaining CMP process time will expire before the next iteration can begin. At that point the CMP process is terminated, as seen in step 312. Typically, the thickness to be removed will not be accomplished in the first one-half cycle of the detector signal, and any variation in the removal rate after being calculated for the preceding one-half cycle will be small. Accordingly, it is believed this forward-looking method will provide a very accurate way of removing just the desired thickness from the wafer.

Figure 11A:
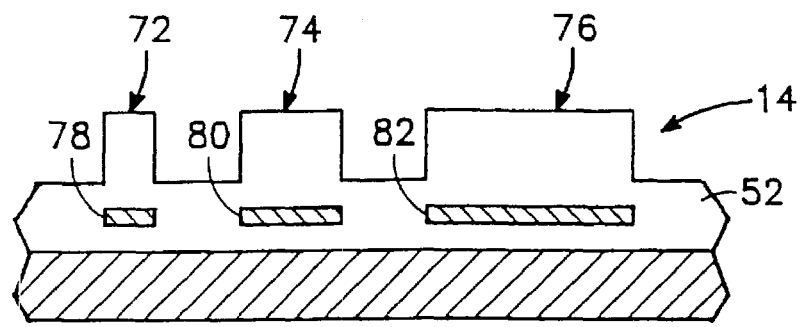
Figure 11B:
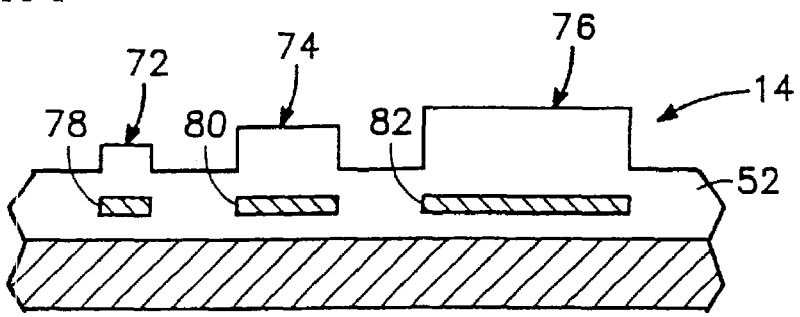
Figure 11C:
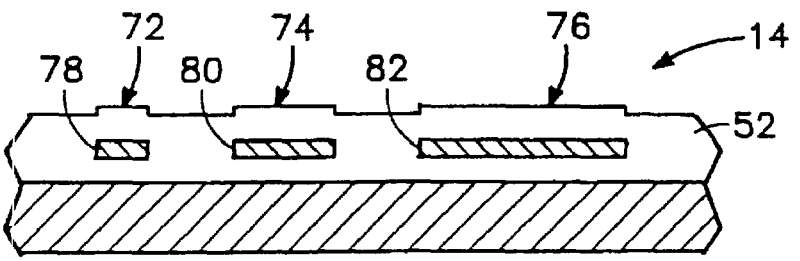

While the just-described monitoring procedure works well for the smooth-surfaced blank oxide wafers being thinned, it has been found that the procedure cannot be successfully used to planarize most patterned wafers where the surface topography is highly irregular. The reason for this is that a typical patterned wafer contains dies which exhibit a wide variety of differently sized surface features. These differently sized surface features tend to polish at different rates. For example, a smaller surface feature located relatively far from other features tends to be reduced faster than other larger features. FIG. 11A-C exemplify a set of surface features 72, 74, 76 of the oxide layer 52 associated with underlying structures 78, 80, 82, that might be found on a typical patterned wafer 14, and the changes they undergo during the CMP process. Feature 72 is a relatively small feature, feature 74 is a medium sized feature, and feature 76 is a relatively large feature. FIG.

11A shows the features 72, 74, 76 before polishing, FIG. 11B shows the features 72, 74, 76 about midway through the polishing process, and FIG. 11C shows the features 72, 74, 76 towards the end of the polishing process. In FIG. 11A, the smaller feature 72 will be reduced at a faster rate than either the medium or large features 74, 76. In addition, the medium feature 74 will be reduced at a faster rate than the large feature 76. The rate at which the features 72, 74, 76 are reduced also decreases as the polishing process progresses. For example, the smaller feature 72 will initially have a high rate of reduction, but this rate will drop off during the polishing process. Accordingly, FIG. 11B shows the height of the features 72, 74, 76 starting to even out, and FIG. 11C shows the height of the features 72, 74, 76 essentially even. Since the differently sized features are reduced at different rates and these rates are changing, the interference signal produced from each feature will have a different phase and frequency. Accordingly, the resultant interference signal, which is partially made up of all the individual reflections from each of the features 72, 74, 76, will fluctuate in a seemingly random fashion, rather than the previously described periodic sinusoidal signal.

Figure 12:
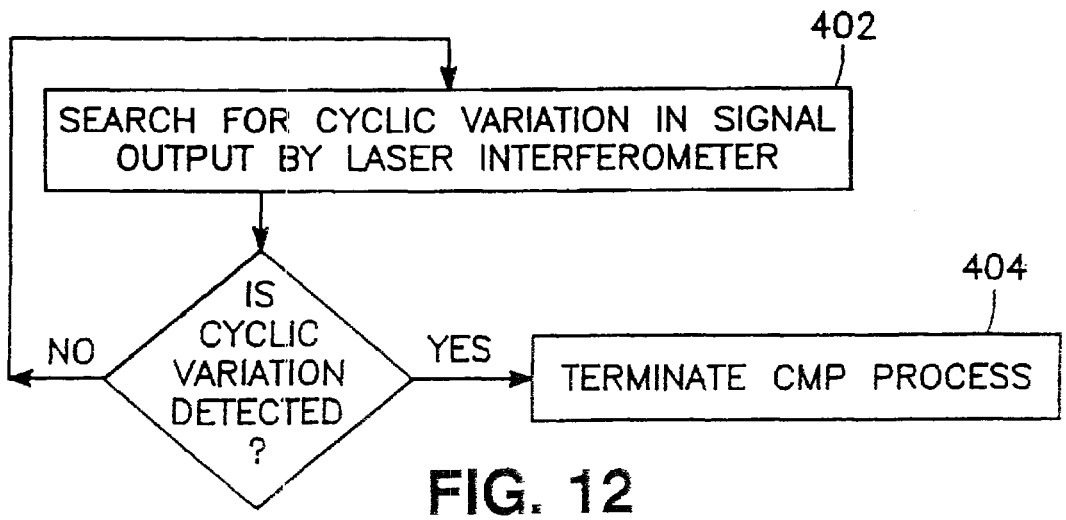
FIG. 12 is a flow chart diagram of a method of determining the endpoint of a CMP process to planarize a patterned wafer with an irregular surface in accordance with the present invention.

However, as alluded to above, the polishing rates of the features 72, 74, 76 tend to converge closer to the point of planarization. Therefore, the difference in phase and frequency between the interference beams produced by the features 72, 74, 76 tend to approach zero. This results in the resultant interference signal becoming recognizable as a periodic sinusoidal wave form. Therefore, it is possible to determine when the surface of a patterned wafer has become planarized by detecting when a sinusoidal interference signal begins. This method is illustrated in FIG. 12. First, in step 402, a search is made for the aforementioned sinusoidal variation in the interferometer signal. When the sinusoidal variation is discovered, the CMP procedure is terminated, as shown in step 404.

Figure 13:
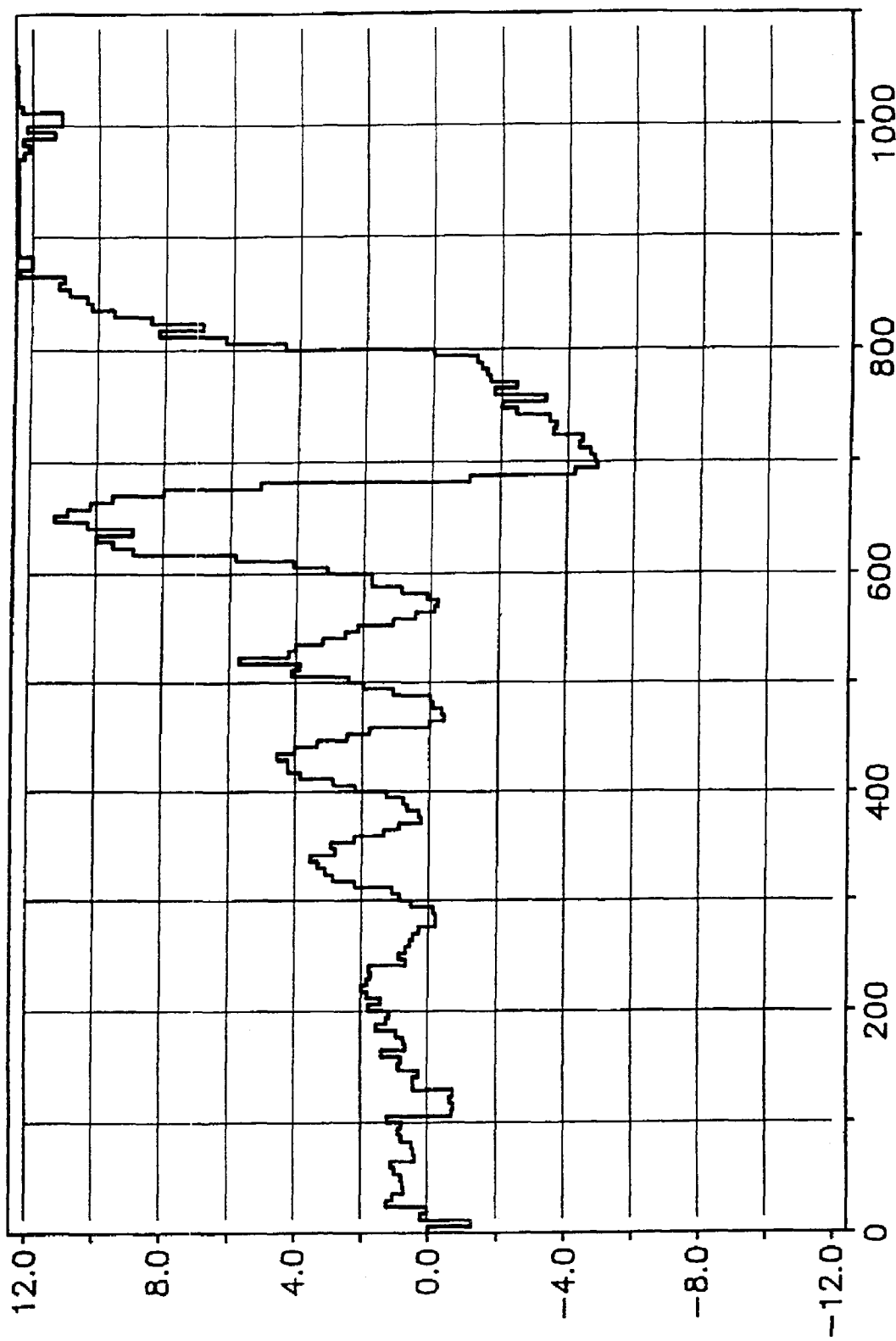
FIG. 13 is a graph showing variation in the data signal from the laser interferometer over time during the planarization of a patterned wafer.

FIG. 13 is a graph plotting the amplitude of the detector signal over time for a patterned wafer undergoing a CMP procedure. The sampled data used to construct this graph was held at its previous integrated value until the next value was reported, thus explaining the squared-off peak values shown. A close inspection shows that a discernible sinusoidal cycle begins to emerge at approximately 250 seconds. This coincides with the point where the patterned wafer first became planarized. Of course, in real-time monitoring of the interferometer's output signal, it would be impossible to know exactly when the cycling begins. Rather, at least some portion of the cycle must have occurred before it can be certain that the cycling has begun. Preferably, no more than one cycle is allowed to pass before the CMP procedure is terminated. A one-cycle limit is a practical choice because it provides a high confidence that the cycling has actually begun, rather than the signal simply representing variations in the noise caused by the polishing of the differently sized features on the surface of the wafer. In addition, the one-cycle limit ensures only a small amount of material is removed from the surface of the wafer after it becomes planarized. It has been found that the degree of planarization is essentially the same after two cycles, as it was after one. Thus, allowing the CMP procedure to continue would only serve to remove more material from the surface of the wafer. Even though one cycle is preferred in the case where the CMP process is to be terminated once the patterned wafer becomes planarized, it is not intended that the present invention be limited to that time frame. If the signal is particularly strong, it might be possible to obtain the same level of confidence after only a portion of a cycle. Alternately, if the signal is particularly weak, it may take more than one cycle to obtain the necessary confidence. The choice will depend on the characteristics of the system used. For instance, the size of the gap between the quartz window and the surface of the wafer will have an effect on signal strength, and so the decision on how many cycles to wait before terminating the CMP process.

The actual determination as to when the output signal from the laser interferometer is actually cycling, and so indicating that the surface of the wafer has been planarized can be done in a variety of ways. For example, the signal could be digitally processed and an algorithm employed to make the determination. Such a method is disclosed in U.S. Pat. No. 5,097,430, where the slope of the signal is used to make the determination. In addition, various well known curve fitting algorithms are available. These methods would essentially be used to compare the interferometer signal to a sinusoidal curve. When a match occurs within some predetermined tolerance, it is determined that the cycling has begun. Some semiconductor applications require that the thickness of the material overlying a structure formed on a die of a patterned wafer (i.e. the film thickness) be at a certain depth, and that this film thickness be repeatable from die to die, and from wafer to wafer. The previously described methods for planarizing a typical patterned wafer will not necessarily produce this desired repeatable film thickness. The purpose of the planarization methods is to create a smooth and flat surface, not to produce a particular film thickness. Accordingly, if it is desirable to control the film thickness over a specific structure, or group of similarly sized structures, an alternate method must be employed. This alternate method is described below.

As alluded to previously, each differently sized surface feature resulting from a layer of oxide being formed over a patterned structure on a die tends to produce a reflected interference signal with a unique frequency and phase. It is only close to the point of planarization that the frequency and phase of each differently sized feature converges. Prior to this convergence the unique frequency and phase of the interference signals caused by the various differently sized features combine to produce a detector signal that seems to vary randomly. However, it is possible to process this signal to eliminate the interference signal contributions of all the features being polished at different rates, except a particularly sized feature, or group of similarly sized features. Once the interference signal associated with the particularly sized feature, or group of features, has been isolated, the methods discussed in association with the removal of material from a blank oxide disk are employed to remove just the amount of material necessary to obtain the desired film thickness.

Of course, the frequency of the interference signal component caused by the feature of interest must be determined prior to the signal processing. It is believed this frequency can be easily determined by performing a CMP process on a test specimen which includes dies exclusively patterned with structures corresponding to the structure which is to have a particular overlying film thickness. The detector signal produced during this CMP process is analyzed via well known methods to determine the unique frequency of the interference signal caused by the surface features associated with the aforementioned structures.

Figure 14:
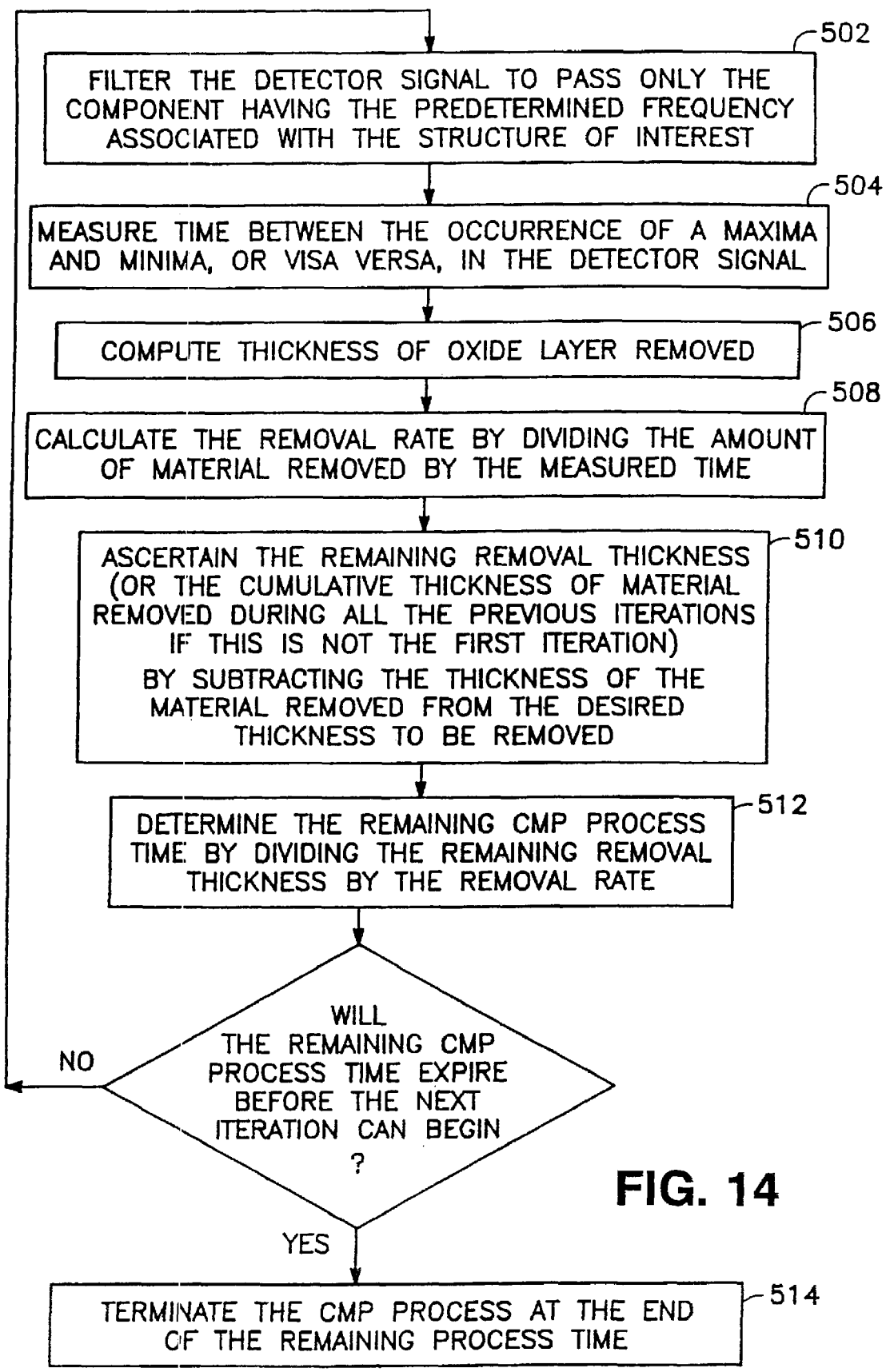
FIG. 14 is a block diagram of a method of determining the endpoint of a CMP process to control the film thickness overlying a particularly sized structure, or group of similarly sized structures, in accordance with the present invention.

The specific steps necessary to perform the above-described method of controlling the film thickness over a specific structure, or group of similarly sized structures on a die, in situ, during the CMP processing of a wafer, will now be described in reference to FIG. 14. In step 502, the detector signal is filtered to pass only the component of the signal having the predetermined frequency associated with the structure of interest. This step is accomplished using well known band pass filtering techniques. Next, in step 504 a measurement is made of the time between the first occurrence of a maxima and minima, or vice versa, in the detector signal (although an entire cycle or any portion thereof could have been employed). The amount of material removed during that portion of the cycle (i.e. one-half cycle) is determined in step 506 via previously described methods. Then, a removal rate is then calculated by dividing the amount of material removed by the measured time, as shown in step 508. This constitutes the rate at which material was removed in the preceding portion of the cycle. In the next step 510, the thickness of the material removed as calculated in step 506 is subtracted from the desired thickness to be removed (i.e. the thickness which when removed will result in the desired film thickness overlying the structure of interest), to determine a remaining removal thickness. Then, this remaining removal thickness is divided by the aforementioned removal rate to determine how much longer the CMP process is to be continued before it termination, in step 512. Once a remaining time has been calculated, the process is repeated for each occurrence of a maxima and minima, or vice versa. Accordingly, the time between the next occurring maxima and minima is measured, the thickness of material removed during the portion of the cycle represented by this occurrence of the maxima and minima (i.e. one-half) is divided by the measured time, and the removal rate is calculated, just as in the first iteration of the method. However, in the next step 510, as shown in brackets, the total amount of material removed during all the previous iterations is determined before being subtracted from the desired thickness. The rest of the method remains the same in that the remaining thickness to be removed is divided by the newly calculated removal rate to determine the remaining CMP process time. This process is repeated until the remaining time expires before the next iteration can begin. At that point, the CMP process is terminated, as seen in step 514.

It is noted that although the method for controlling film thickness described above utilizes the method for determining the CMP process endpoint illustrated in FIG. 10B, any of the other endpoint determination methods described herein could also be employed, if desired.

Figure 15A:
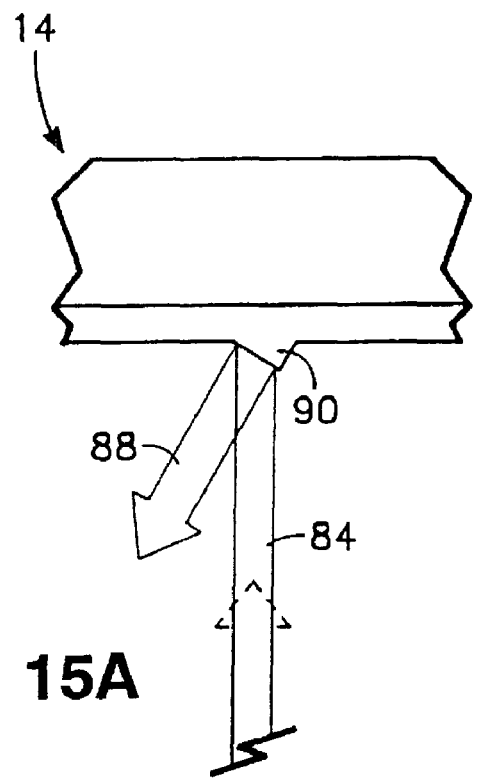
FIG. 15A is a simplified cross-sectional view of a wafer with a surface imperfection being illuminated by a narrow-diameter laser beam.
Figure 15B:
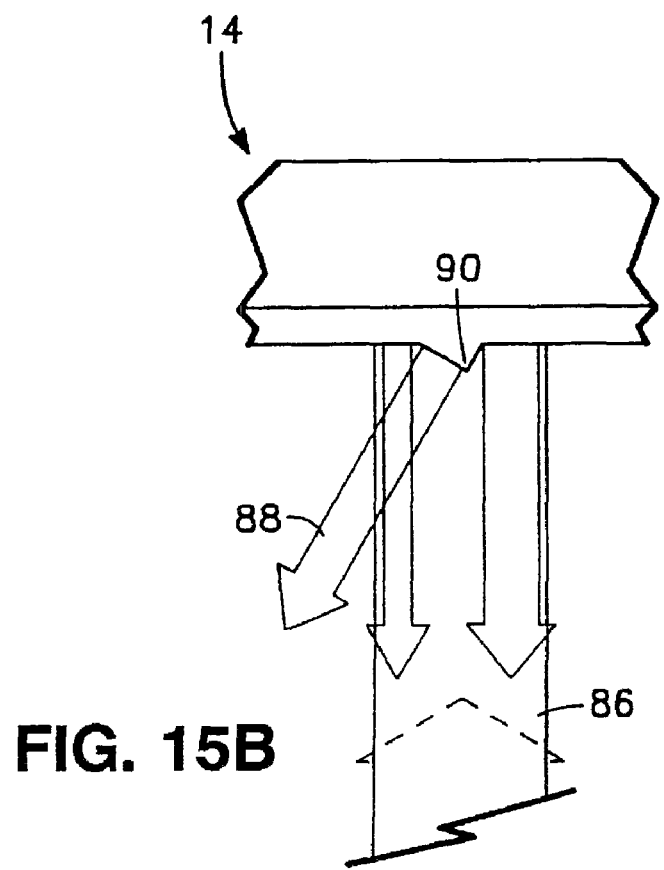
FIG. 15B is a simplified cross-sectional view of a wafer with a surface imperfection being illuminated by a wide-diameter laser beam.

It is further noted that the beam diameter (i.e. spot) and wavelength of the laser beam generated by the laser interferometer can be advantageously manipulated. As shown in FIGS. 15A and 15B, a narrow beam 84, such as one focused to the smallest spot possible for the wavelength employed, covers a smaller area of the surface of the wafer 14 than a wider, less focused beam 86. This narrow beam 84 is more susceptible to scattering (i.e. beam 88) due to surface irregularities 90, than the wider beam 86, since the wider beam 86 spreads out over more of the surface area of the wafer 14, and encompasses more of the surface irregularities 90. Therefore, a wider beam 86 would have an integrating effect and would be less susceptible to extreme variations in the reflected interference signal, as it travels across the surface of the wafer 14. Accordingly, a wider beam 86 is preferred for this reason. The laser beam width can be widened using well known optical devices.

It must also be pointed out that the wider beam will reduce the available data acquisition time per platen revolution since the time in which the beam is completely contained within the boundaries of the window is less than it would be with a narrower beam. However, with the previously described methods of data acquisition, this should not present a significant problem. In addition, since the wider beam also spreads the light energy out over a larger area than a narrower beam, the intensity of the reflections will be lessen somewhat. This drawback can be remedied by increasing the power of the laser beam from the laser interferometer so that the loss in intensity of the reflected beams is not a factor in detection.

As for the wavelength of the laser beam, it is feasible to employ a wavelength anywhere from the far infrared to ultraviolet. However, it is preferred that a beam in the red light range be used. The reason for this preference is two-fold. First, shorter wavelengths result in an increase in the amount of scattering caused by the chemical slurry because this scattering is proportional to the 4th power of the frequency of the laser beam. Therefore, the longer the wavelength, the less the scattering. However, longer wavelengths also result in more of the oxide layer being removed per period of the interference signal, because the amount of material removed per period equals approximately $\lambda/2$ n. Therefore, the shorter the wavelength, the less material removed in one period. It is desirable to remove as little of the material as possible during each period so that the possibility of any excess material being removed is minimized. For example, in a system employing the previously described method by which the number of cycles, or a portion thereof, are counted to determine the thickness of the oxide layer removed, any excess material removed over the desired amount would be minimized if the amount of material removed during each cycle, or portion thereof, is as small as possible.

It is believed these two competing factors in the choice of wavelength are optimally balance if a red light laser beam is chosen. Red light offers an acceptable degree of scattering while not resulting in an unmanageable amount of material being removed per cycle.

Further Embodiments

The generated interference waveform provides considerable additional information about the polishing process. This additional information can be used to provide an in-situ measurement of the uniformity of the polished layer. It can also be used to detect when the CMP system is not operating within spec (i.e., not operating as desired). Both of these uses will now be described.

Uniformity Measurement:

The polishing and/or planarization operations which are performed on the CMP system are generally required to produce a surface layer that is uniform across the surface of the wafer/substrate. In other words, the center of the wafer should polish at the same rate as the edge of the wafer. Typically, the thickness of the polished layer must not vary by more than about 5-10%. If that level of uniformity is not achieved, it is likely that the wafer will not be usable since the device yields will be unacceptably low. In practice, it is often quite difficult to achieve a uniform polishing rate across the wafer. It typically requires optimizing many different variables to keep it performing within the specs. The end point detector described above provides a very useful tool for monitoring the uniformity of the layer being polished and that monitoring can be performed both in-situ data acquisition and processing.

We have discovered that the interference waveform that is produced by the interferometer during polishing provides information about the uniformity of the layer that is being polished. As noted above, the output of the interferometer appear as a sinusoidal signal as the surface layer (e.g. oxide layer) is being polished. The distance between the peaks of that signal indicate how much material has been removed. On top of that sinusoidal signal there will also be another higher frequency sinusoidal signal. The amplitude of the higher frequency signal indicates by how much the thickness of the polished layer varies across the surface of the wafer.

Figure 16:
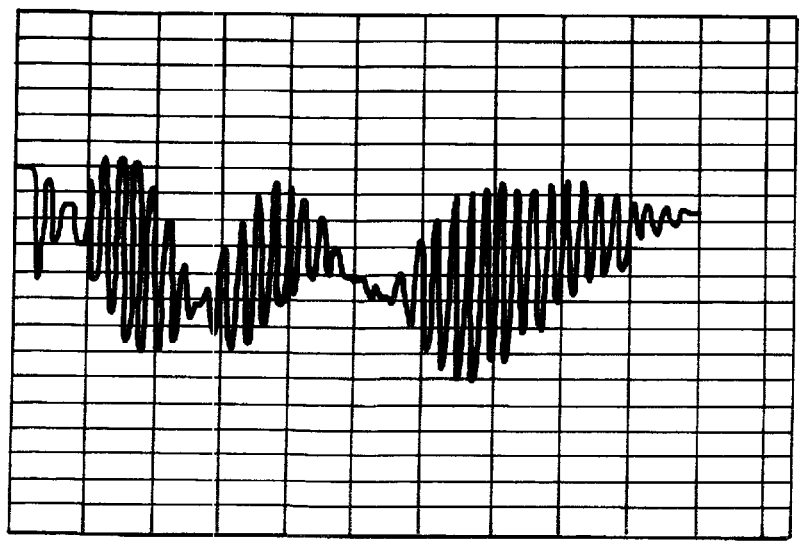
FIG. 16 is a graph showing the cyclic variation in the data signal from the laser interferometer over time during the thinning of a blank oxide wafer and including the high frequency signal associated with a nonuniform wafer surface.

The reason that the high frequency signal appears is as follows. As the polishing is being performed, the interferometer typically samples (or looks at) different locations across the surface of the wafer. This is because during polishing, both the platen and the wafer are rotating and in addition the wafer is also being moved axially relative to the platen. Thus, during polishing different areas of the wafer's surface pass over the hole in the platen through which the interferometer sees the layer that is being polished. If the polished layer is completely uniform, the resulting interference waveform will be unaffected by the sampling of the different locations across the wafer's surface. That is, it will have substantially the same amplitude. On the other hand, if the polished layer is not uniform, the sampling of different locations introduce, a further variation onto the sinusoidal base signal. This further variation has a frequency that is dependent on the rotation and sweep rates that are used and it has an amplitude that is proportional to the degree of nonuniformity of the polished layer. An example of such a waveform is shown in FIG. 16. In this particular example, the nonuniformity was relatively large so as to clearly illustrate the high frequency signal.

A measure of the uniformity is the ratio of the peak-to-peak amplitude $A_{hf}$ of the high frequency signal to the peak-to-peak amplitude $A_{lf}$ of the low frequency signal. The smaller this ratio, the more uniform the polished layer will be; and conversely, the larger this ratio, the more nonuniform it will be.

Figure 17:
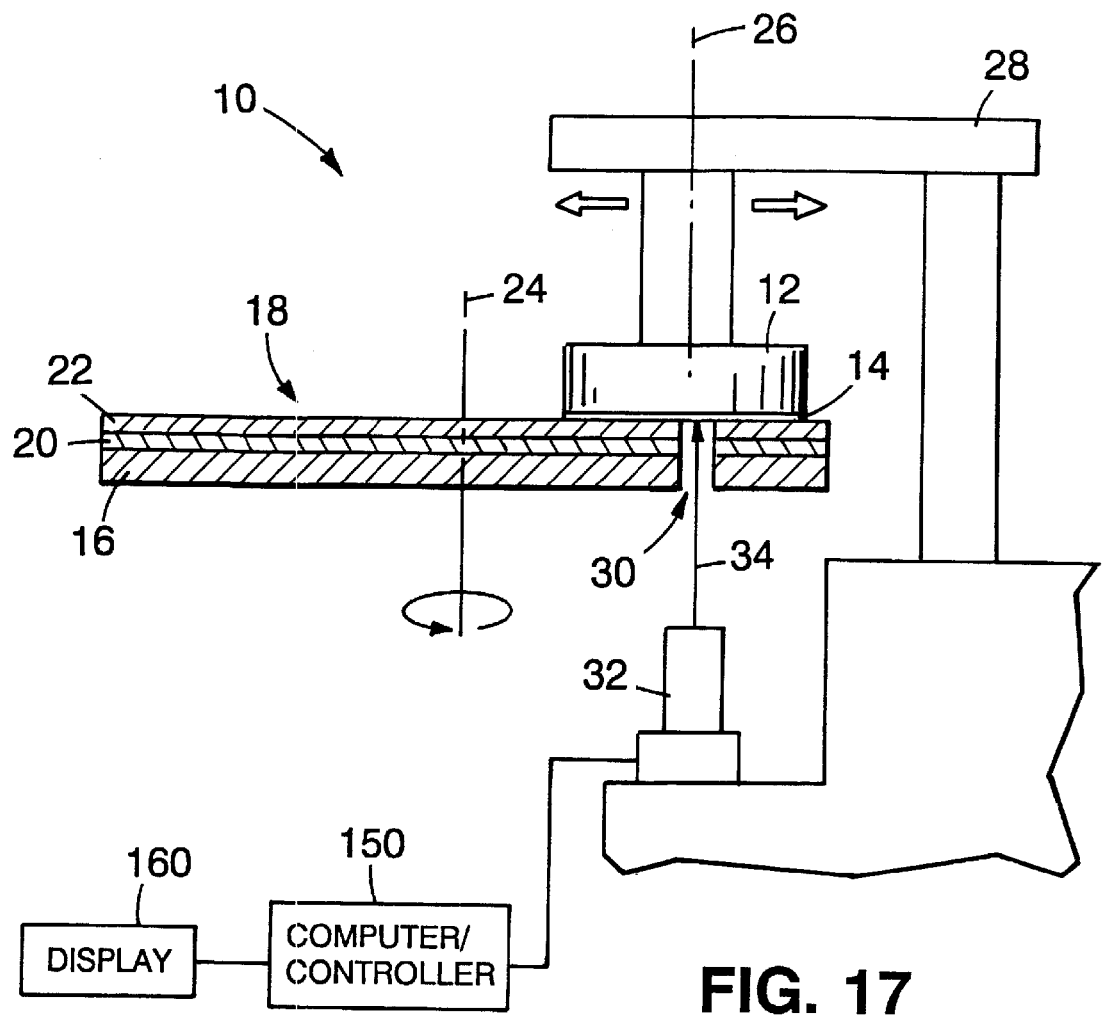
FIG. 17 is a schematic representation of a CMP system including an interferometer and a computer programmed to analyze and respond to the output signal of interferometer waveform.

A CMP system which produces a measure of uniformity is shown in FIG. 17. In addition to the components shown in the previously described FIG. 2, it also includes a computer 150, which is programmed to control the operation of the interferometer and to perform the signal analysis that is required to produce a measure of uniformity from the interference signal, and it includes a display unit 160 through which various information and results are displayed to an operator. Computer 150 can be any device which is capable of performing the control and signal processing functions including, for example, a standard PC which is programmed appropriately and a dedicated, specially designed digital processing unit. Display unit 160 can be a video display, a printer, or any appropriate device or combination of devices for communicating information to the operator of the CMP system.

Figure 18:
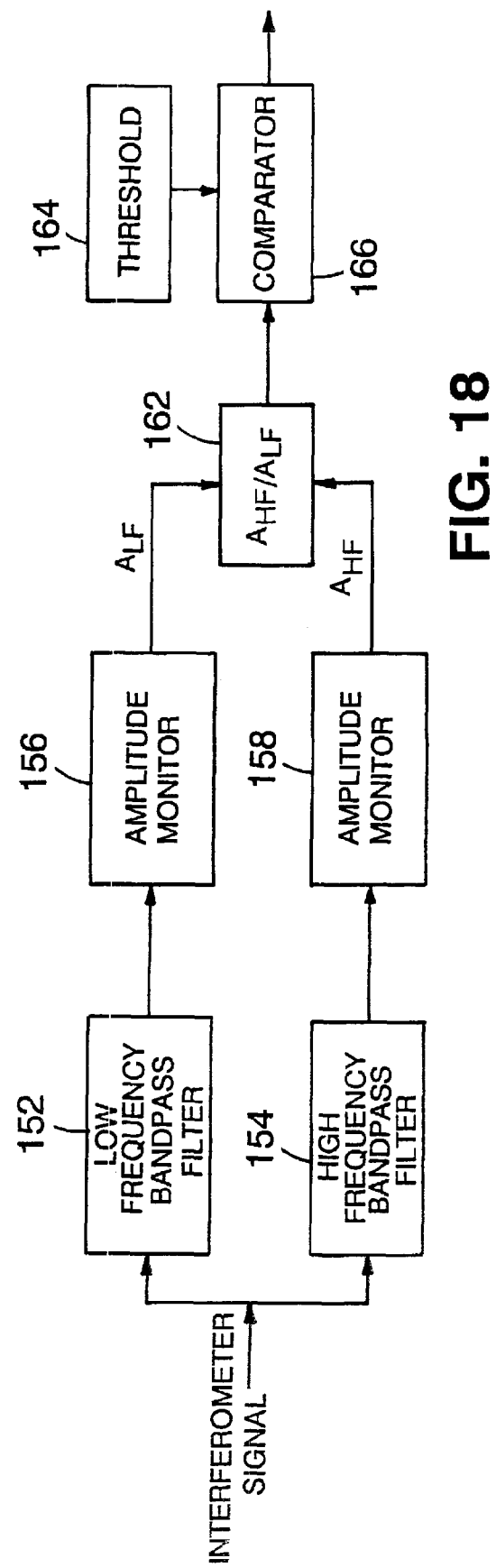
FIG. 18 is a block diagram showing the functionality that is implemented within the computer to perform in-situ monitoring of uniformity.

To generate a uniformity measure, computer 150 is programmed to implement and perform the signal processing and other functions shown in FIG. 18. In that regard, computer 150 implements two programmable bandpass filters, namely, a high frequency filter 152 and a low frequency filter 154. High frequency filter 152 has a passband centered on the frequency of the high frequency signal containing the uniformity information and low frequency filter 154 has a passband centered on the frequency of the low frequency signal containing the polishing rate information. The width of both of these passbands is on the order of a few millihertz in the case when the period is on the order of tens of seconds. Indeed, the width of the passband is programmed to vary in proportion with the center frequency, or stated differently, to vary inversely to the period of the signal being examined. That is, if the period of the relevant signal increases, the bandwidth of the passband filter decreases and vice versa.

Figure 19A:
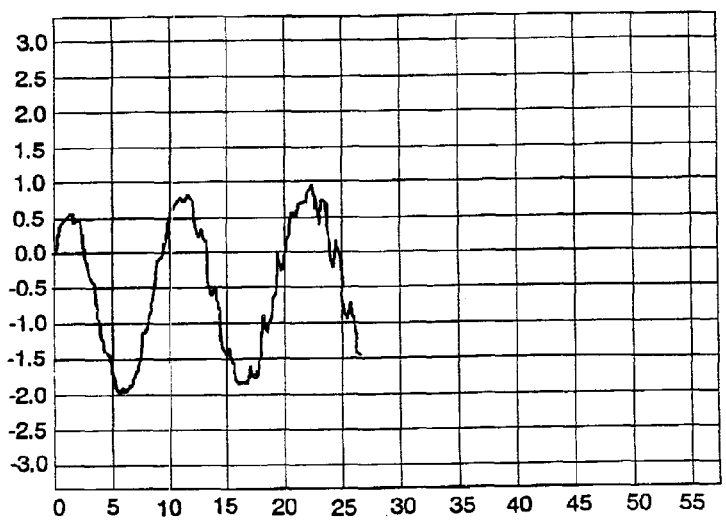
FIGS. 19(a)-(c) show examples of an interferometer signal, the interferometer signal after it has been filtered by a low frequency bandpass pass filter, and the interferometer signal after it has been filtered by a high frequency bandpass pass filter, respectively.
Figure 19B:
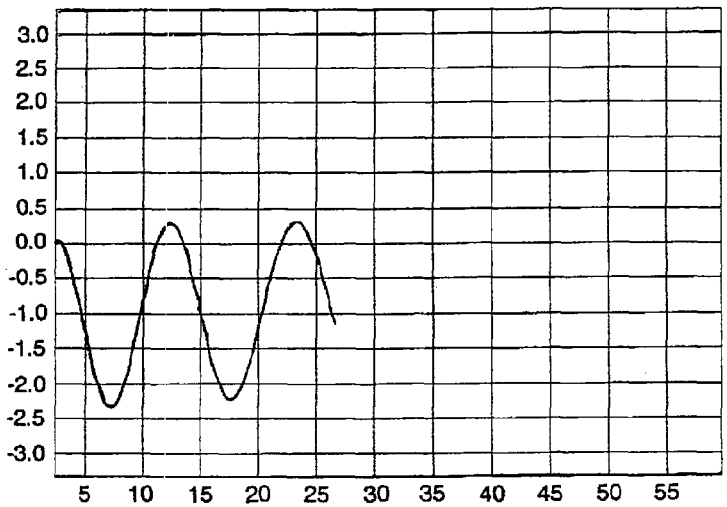
Figure 19C:
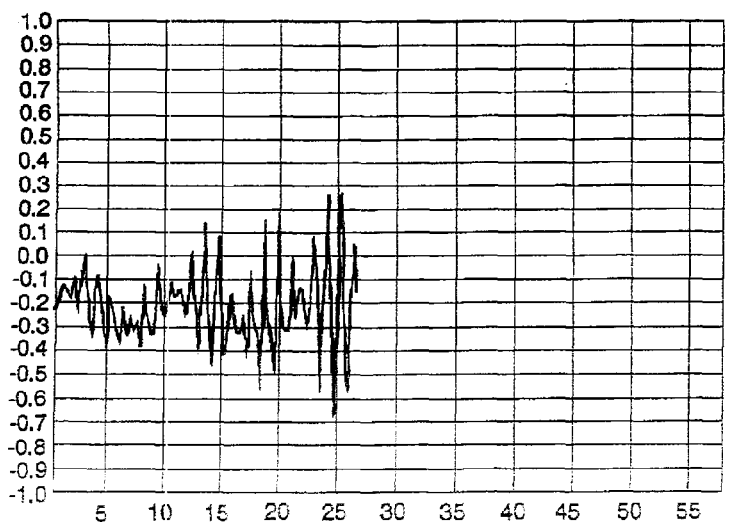

FIG. 19(a) shows an example of an interferometer signal obtain from an actual system. Note that initially the signal indicates that the layer is quite uniform, i.e., no discernible high frequency signal is riding on top of the low frequency signal. After polishing has been performed for a short period of time, a high frequency signal begins to appear, indicating a certain level of nonuniformity. Low frequency filter 154 selects the low frequency component and filters out the other frequencies to produce an output signal of the form shown in FIG. 19(b). Similarly, high frequency filter 152 selects the high frequency component and filters out the other frequencies to produce an output signal of the form shown in FIG. 19(c).

Computer 150 implements two amplitude measurement functions 156 and 158 which measure the peak-to-peak amplitudes of the output signals of filters 152 and 154, respectively. Once the amplitudes of the two filtered signals has been determined, computer 150 computes a ratio of the p-p amplitude of the high frequency signal to the p-p amplitude of the low frequency signal (i.e., $A_{hf}/A_{lf}$) (see functional block 162). After the ratio has been computed, computer 150 compares (see block 166) the computed ratio to a threshold or reference value 164 that was previously stored in local memory. If the computed ratio exceeds the stored threshold value, computer 150 alerts the operator that nonuniformity of the polished layer exceeds an acceptable amount. In response, the operator can adjust the process parameters to bring the process back into spec.

Since the high frequency signal tends to appear only after some polishing has been performed, it is useful to wait before attempting to measure nonuniformity. Indeed, it may be desirable to automatically compute the ratio periodically so as to monitor the uniformity of the polished layer throughout the polishing operation. In that case, it may also be desirable for computer 150 to output the computed ratios throughout the process so that the operator can detect changes and/or trends which are appearing in the polishing process. This would be particularly useful if the in-situ monitoring was done during on actual production wafers during polishing.

Note that the functions just described can be implemented through software that is running on the computer or they can be implemented through dedicated circuits built for this specific purpose.

The bandpass filters can be implemented using techniques which are well known to persons skilled in the art. In the described embodiment, they are FIR (finite impulse response) filters which can be implemented in either the frequency or the time domain. However, to perform the filtering in real time as the interferometer signal becomes available, the filtering is done in the time domain by convolving the appropriate function with the waveform as it is being generated. The appropriate function is, of course, simply the time domain representation of a bandpass filter having the desired characteristics (i.e., center frequency and bandwidth).

To specify the appropriate filter parameters it is necessary to know the frequency of the signal that is to be selected by the filter. This information can be obtained easily from the interferometer signal waveform(s). For example, the center frequency for the low frequency filter can be obtained by running a batch (e.g. 25) of wafers (e.g. blank wafers with only an oxide coating) to obtain an accurate measure of the polishing rate. Alternatively, the polishing rate can be determined at the start of a polishing run by measuring the distance between peaks of the low frequency signal. Of course, using this alternative approach produces results that are not as accurate as averaging measurements over a larger number of wafers. In any case, the polishing rate determines the center frequency of the bandpass filter and by knowing the center frequency along with the desired bandwidth of the filter one can readily determine the precise form of the time domain filter function and/or the coefficients of the FIR filter.

The frequency of the high frequency signal can be obtained in a similar manner, i.e., directly from the trace that is generated by the interferometer as the CMP system is polishing the wafer. In other words, the operator simply measures the distance between peaks of the high frequency signal. This process can be readily automated so that the operator, with the aid of a pointing device (e.g. a mouse), can mark two points on the waveform appearing on a video display and the computer can be programmed to automatically compute the frequency and then generate the appropriate filter coefficients. The filter coefficients and/or time domain representation of the filter functions are then stored in local memory for use later during the polishing runs to perform the filtering operations.

Process Signature:

The interferometer waveform also represents a signature of (i.e., it characterizes) the system for which it was obtained. Because of this, it provides information which is useful for qualifying a system for production operation. If a signature is obtained for a system that is known to be operating as desired, that signature waveform (or features extracted from the waveform) can be used as a reference against which subsequently generated signatures can be compared to determine whether the system or systems from which signatures were subsequently obtained are performing within spec. For example, if the polishing pads are changed or a new batch of slurry is used in the CMP system, the operator needs to know whether that change has detrimentally affected the quality of the polishing which the system performs. We have discovered that a change in performance of the CMP system results in a change in the signature. That is, certain features will appear in the waveform that were not previously present or previously existing features will change. By detecting those changes, it is possible to detect when a system is not performing as desired.

In the described embodiment, the extracted features from the interferometer waveform are the polishing rate and the measure of uniformity. Both of these characteristics are readily obtainable from the interferometer waveform that is generated during polishing by using the methods previously described. A properly operating system will produce a particular polishing rate and a particular measure of uniformity. A drift away from these reference values provides an indication that the system is moving away from its desired operating point and alerts the operator to the need for corrective action so as to avoid destroying product.

Figures 20A, 20B:
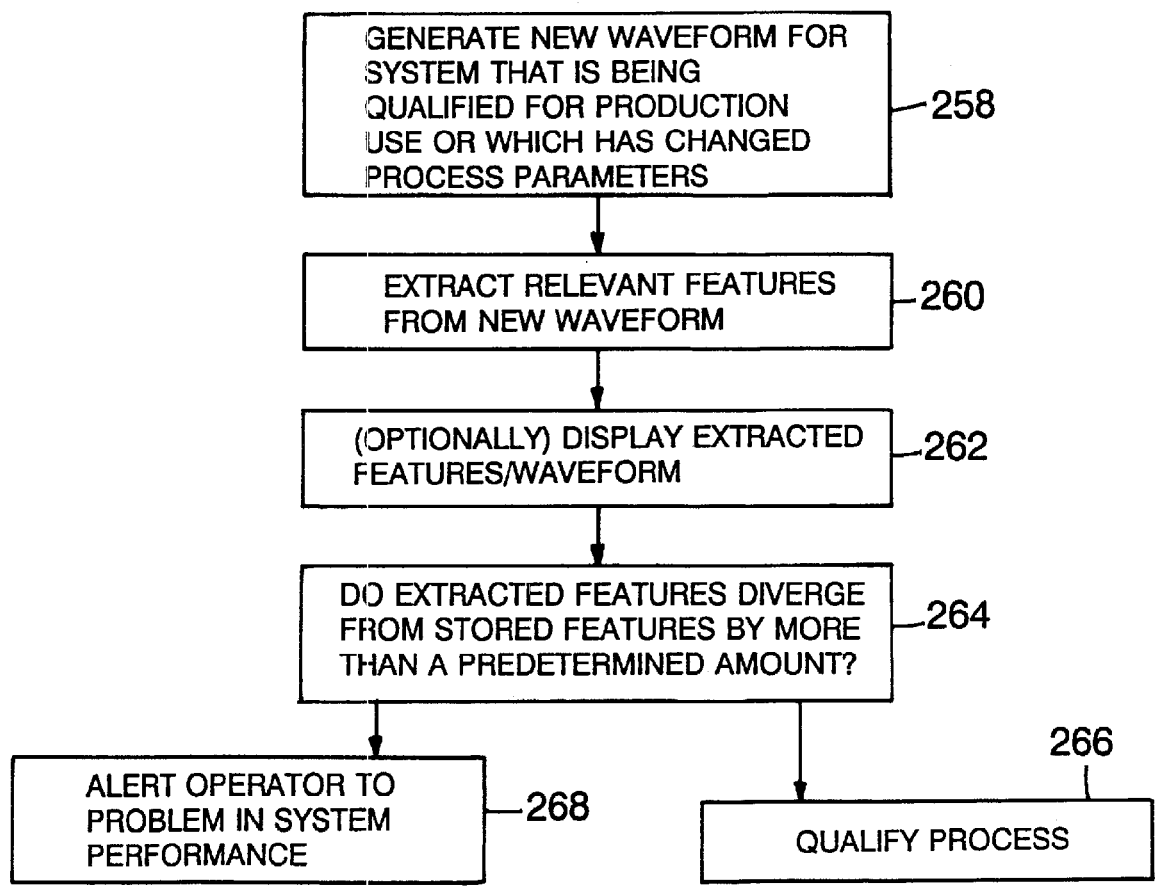
FIG. 20(a)-(b) are flow charts showing the procedure for generating and then using a signature of a CMP system to qualify it for production use.

A method which uses a CMP system signature is illustrated in FIG. 20a and will now be described. Initially, an interferometer waveform (i.e., a signature) is generated for a CMP system which is known to be operating optimally (step 250). The decision as to whether the system is operating optimally can be determined empirically by processing a set of test wafers and analyzing the results. When the results that are produced are within spec, then the signature can be generated for that configuration and set of operating conditions. Before capturing a portion of the interferometer waveform, it is desirable to polish the wafer between 50-100% of the way through the oxide so that the waveform is truly a signature of the polishing set up.

After the waveform has been obtained, certain relevant features are then extracted from the generated waveform (step 252) and stored for later use as a reference against which to evaluate that system's performance at some later time or times (step 254). Alternatively, the waveform itself can be stored and used as the reference. In the described embodiment, the extracted features are the polishing rate and the measure of uniformity, both of which can be determined from the waveform as described above.

Referring to FIG. 20b, at some later time the stored signature (or extracted features) can be used to qualify that system or another system for production use. To qualify a system for production, a new signature is obtained for that system (step 258) and the relevant features are extracted from that new signature (step 260). The extracted features are then compared to the stored reference set of features (step 264). If the operating point, as characterized by the set of extracted features, falls within a predetermined region around the reference point, as defined by the stored reference set of features, then it is concluded that the system is operating properly and that it can be brought online for processing product wafers (step 266). If this process is automated, the computer may at this point alert the operator that the process is within spec. On the other hand, if the operating point falls outside of the predetermined region, that is an indication that the system is not operating within spec and the operator is alerted to this problem so that corrective action can be taken (step 268). The corrective action might involve adjusting some process parameter appropriately to bring the process within spec. For example, if the polishing rate is excessive or if oxide nonuniformity is larger than permitted, then the operator may recognize that it is appropriate to try a new batch of slurry, or to adjust the pressure on the pad, or to even replace the pad. The particular course of corrective action that is chosen will of course depend upon the details of how the system has departed from its desired operating point, the configuration and operating parameters of the particular system, and what the operator's experience has taught him.

To provide further useful information to the operator, the computer also optionally outputs through its display device(s) information about the extracted features (step 262). The displayed information may be presented as the extracted features, the waveform, how close the various extracted features are to the different features of the stored reference set, or in whatever manner proves to be most useful for the operator.

Of course, the above-described in-situ, real time monitoring procedure can be used periodically while processing production wafers or whenever some process parameter is changed in the CMP system (e.g. a new polishing pad is used, pad pressure is adjusted, or a new batch of slurry is used) and it becomes necessary to know that the CMP process is still within spec. In addition, it can be used on blank wafers, instead of actual product, to qualify the CMP system prior to using it on actual product.

Though we have described a straight forward and simple approach to extracting information from the signature waveform, i.e., by using the polishing rate and the measure of uniformity, the signature or interferometer waveform can be analyzed by using more sophisticated techniques (e.g. pattern or feature recognition or other image analysis algorithms, or neural networks, just to name a few alternatives). The information which various extracted features convey regarding the operation of the system can be determined through experience and the ones which convey the information that is perceived to be of most importance to the operator can be used.

Also, it should be noted that simply displaying the interferometer waveform (i.e., the process signature) to the operator can be yield valuable feedback on how well the system is behaving. Typically, the human eye is extremely sensitive in detecting even subtle changes in an image from what one expects to see. Thus, after gaining some experience, the operator will often be able to detect changes and imminent problems in the overall CMP system performance simply by looking at the waveform. Thus, in the described embodiment, the computer also displays the signature waveform to the operator during processing so that the operator can also use it to monitor equipment performance.

Using techniques known to persons skilled in the art, one can readily develop software algorithms which automatically recognize or detect the changes for which the operator is looking and which tip off the operator to certain problems.

A Modification for Obtaining Improved Performance

Figure 21A:
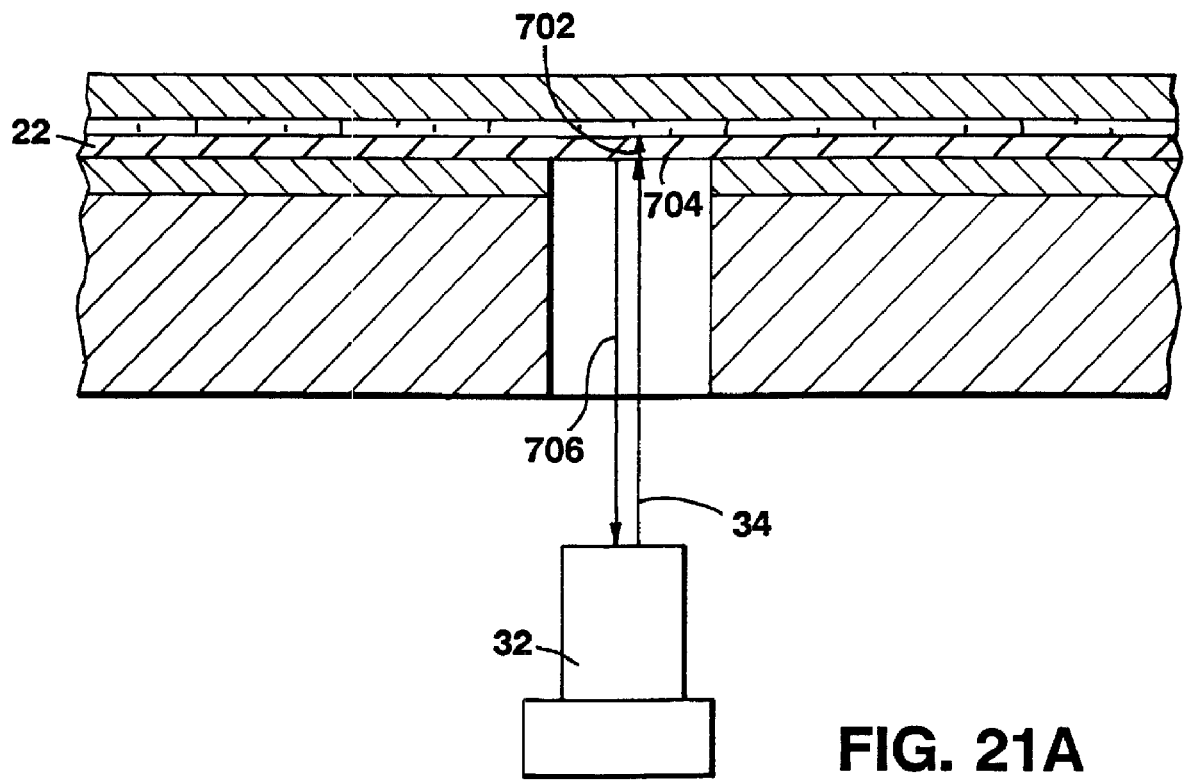
FIG. 21(a) is simplified cross-sectional view of an embodiment of the window portion of the apparatus of FIG. 2 employing the polishing pad as the window, and showing a reflection from the backside of the pad.
Figure 21B:
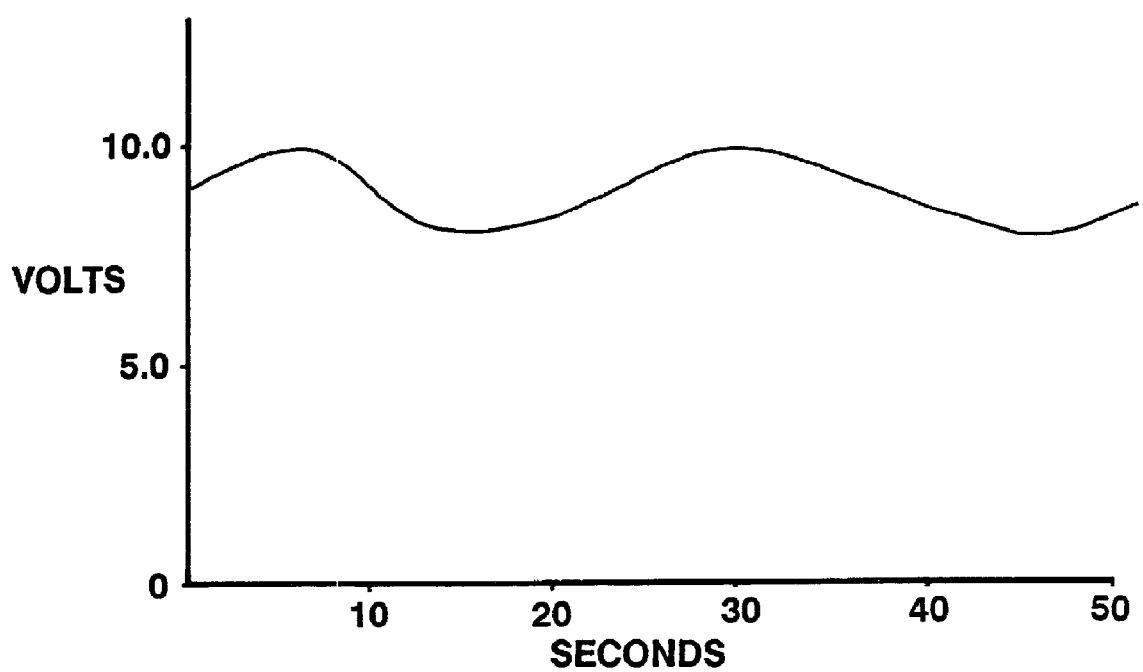
FIG. 21(b) is a graph showing the cyclical variation in the data signal from the laser interferometer over time with a large DC component caused by the reflection from the backside of the pad of the embodiment of FIG. 21(a).

Another embodiment involves a modification to the window in the pad between the interferometer and the wafer. Although the pad will transmit a substantial portion of the interferometer laser beam, it has been found that there is also a significant reflective component from the bottom surface of the pad. This situation is illustrated in FIG. 21(a) where part of the laser beam 34 emanating from the laser interferometer 32 is transmitted through the pad 22 to form a transmitted beam 702, and part of the laser beam 34 is reflected from the backside surface 704 of the pad 22 to form a reflected beam 706. The reflected beam 706 creates a considerable direct current (DC) shift in the data signal. FIG. 21(b) illustrates this shift (although exaggerated for purposes of clarity). Inn this example, the DC shift resulting from the reflected laser light adds about 8.0 volts to the overall signal. The DC shift creates problems in analyzing the useful portion of the data signal. For example, if the data analysis equipment operates in a range of 0-10 volts, amplification of the DC shifted signal to enhance the portion of interest is all but impossible without reducing or eliminating the DC component of the signal. If the DC component is not eliminated, the equipment would be saturated by the amplified signal. Reducing or eliminating the DC component electronically requires added signal processing electronics and may result in a degradation of the useful portion of the signal. Even if the DC shift is not as large as described here, some signal processing will still likely be required to eliminate it. Accordingly, a non-electronic method of reducing or eliminating this unwanted DC component is desirable.

Figure 21C:
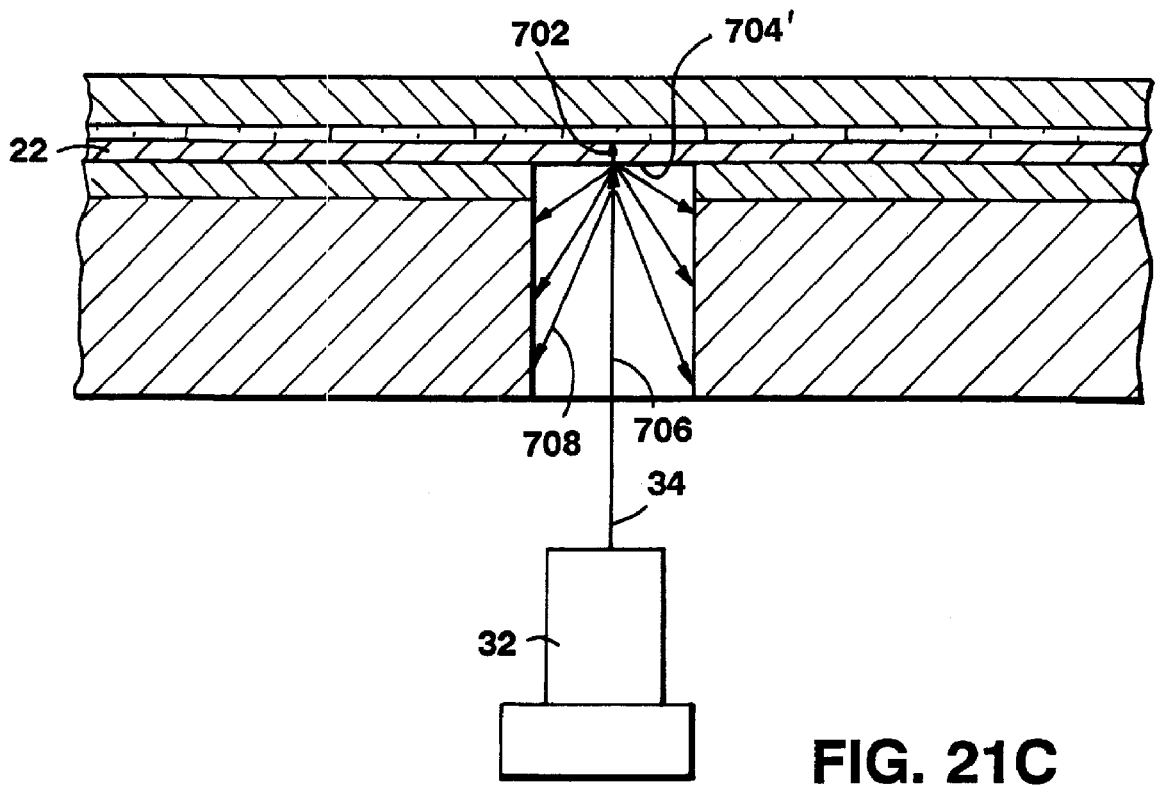
FIG. 21(c) is simplified cross-sectional view of an embodiment of the window portion of the apparatus of FIG. 2 employing the polishing pad as the window with a diffused backside surface to suppress reflections.

It has been found that by creating a diffuse surface 704 on the backside of the pad 22 in the area constituting the window, as depicted in FIG. 21(c), the reflected light from that surface is attenuated. Thus, the unwanted DC component of the data signal is reduced. The diffuse surface 704 in effect scatters the non-transmitted laser light 708 rather than reflecting most of it back towards the interferometer 32. The reflected signal from the wafer must also pass through the diffuse surface 704 and in doing so some of it will also be scattered. However, it has been found that this does not seriously degrade the performance of the interferometer.

Figure 21D:
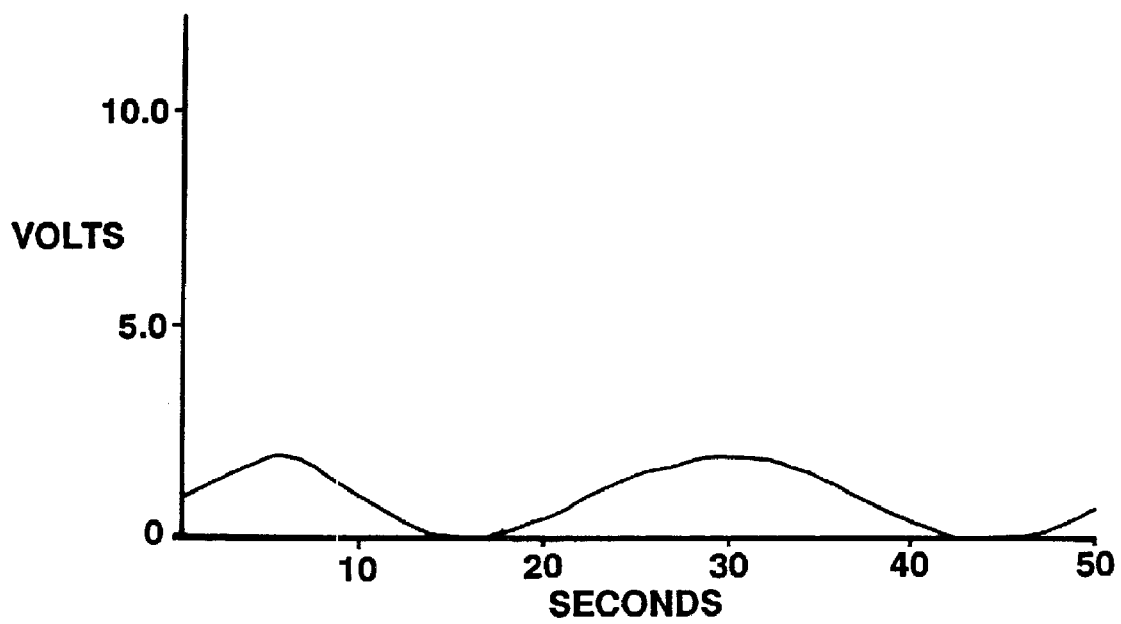
FIG. 21(d) is a graph showing the cyclical variation in the data signal from the laser interferometer over time without the large DC component caused by reflection from the backside of the pad as a result of the diffuse backside surface of the embodiment of FIG. 21(c).

FIG. 21(d) illustrates the data signal obtained when the diffuse surface 704 is employed. As can be seen, with the elimination of the DC component, the signal can be readily amplified and processed without the need to electronically eliminate any DC portion.

How the diffuse surface is produced is not of central importance. It can be produced by sanding the back surface of the polishing pad in the vicinity of the window or by applying a material coating which is diffuse (e.g. Scotch tape), or in any other way that produces the desired results.

The present invention has been described in terms of a preferred embodiment. The invention, however, is not limited to the embodiment depicted and described. Rather, the scope of the invention is defined by the appended claims.

What is claimed is:

1. A polishing pad assembly for a chemical mechanical polishing apparatus, comprising:
   a polishing pad having a polishing surface and a surface opposite the polishing surface for attachment to a platen; and
   a solid light-transmissive window formed in the polishing pad, the light-transmissive window being more transmissive to light than the polishing pad, the light-transmissive window having a light-diffusing bottom surface.

2. The polishing pad of claim 1, wherein a top surface of the light-transmissive window is flush with the polishing surface.

3. The polishing pad of claim 1, wherein the bottom surface of the light-transmissive window is flush with the surface opposite the polishing surface.

4. The polishing pad of claim 1, wherein the light-diffusing bottom surface comprises an abrasion of the window.

5. The polishing pad of claim 1, wherein the polishing pad comprises a cover layer with the polishing surface and a backing layer adjacent the cover layer, and wherein the window is formed in the cover layer and an aperture is formed in the backing layer and aligned with the window.

6. A chemical mechanical polishing system, comprising:
   a platen;
   a polishing pad according to claim 1 secured to the platen;
   a polishing head which during polishing holds a substrate against the polishing pad on the platen;
   an interferometer capable of generating a collimated light beam which during polishing is directed at and impinges on a side of the substrate that is being polished, the interferometer generating an interference signal; and
   a data processor programmed to compute a measure of uniformity from the interference signal.

* * * * *

UNITED STATES PATENT AND TRADEMARK OFFICE
CERTIFICATE OF CORRECTION

PATENT NO. : 8,092,274 B2  
APPLICATION NO. : 12/955690  
DATED : January 10, 2012  
INVENTOR(S) : Manoocher Birang et al.

Page 1 of 1

It is certified that error appears in the above-identified patent and that said Letters Patent is hereby corrected as shown below:

On the Title Page
Item (63) (Related U.S. Application Data), Column 1, Line 7, Delete "11/255,838," and insert -- 11/225,828, --, therefor.

Signed and Sealed this
Sixth Day of March, 2012

David J. Kappos
*Director of the United States Patent and Trademark Office*